US008235790B2

(12) United States Patent
Yoshizawa

(10) Patent No.: US 8,235,790 B2
(45) Date of Patent: Aug. 7, 2012

(54) SLOT MACHINE

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1092 days.

(21) Appl. No.: 12/137,025

(22) Filed: Jun. 11, 2008

(65) Prior Publication Data

US 2009/0227326 A1 Sep. 10, 2009

Related U.S. Application Data

(60) Provisional application No. 61/034,626, filed on Mar. 7, 2008.

(51) Int. Cl.
*A63F 13/00* (2006.01)

(52) U.S. Cl. ........................................... 463/20; 463/25

(58) Field of Classification Search .............. 463/16–25, 463/30–42

See application file for complete search history.

(56) References Cited

U.S. PATENT DOCUMENTS

| | | | | |
|---|---|---|---|---|
| 6,394,902 | B1 | 5/2002 | Glavich et al. | |
| 6,666,765 | B2 * | 12/2003 | Vancura | 463/9 |
| 2006/0068893 | A1 * | 3/2006 | Jaffe et al. | 463/20 |
| 2006/0172792 | A1 * | 8/2006 | Vancura | 463/16 |
| 2007/0060376 | A1 * | 3/2007 | Nelson et al. | 463/42 |
| 2009/0124330 | A1 * | 5/2009 | Leger | 463/20 |
| 2009/0124364 | A1 * | 5/2009 | Cuddy et al. | 463/27 |
| 2009/0209317 | A1 * | 8/2009 | Gomez | 463/20 |
| 2010/0093422 | A1 * | 4/2010 | Gomez | 463/20 |

* cited by examiner

*Primary Examiner* — Masud Ahmed

(74) *Attorney, Agent, or Firm* — KMF Patent Services, PLLC; Kenneth M. Fagin, Esq.

(57) ABSTRACT

A slot machine includes a display device for displaying a symbol matrix display region in which plural types of symbols are displayed; a memory for storing data concerning a number of predetermined symbols arranged in the symbol matrix display region; and a processor for controlling the display device and the memory, the processor being programmed to: (a) execute a basic game; (b) rearrange the plural types of symbols in the symbol matrix display region during the basic game; (c) cumulatively store in the memory, the data concerning the number of the predetermined symbols from among the plural types of symbols, the predetermined symbols being rearranged in the symbol matrix display region during the basic game; (d) determine a number of times in executing a free game by executing a sub game by a number of times equal to the number of the predetermined symbols rearranged in the symbol matrix display region by referring to the data concerning the number of the predetermined symbols stored in the memory; and (e) execute the free game based on the number of times determined in the itemized (d).

8 Claims, 16 Drawing Sheets

SLOT MACHINE

CROSS-REFERENCE TO RELATED APPLICATIONS

This application claims priority of U.S. Provisional Application No. 61/034,626 filed on Mar. 7, 2008. The contents of this application are incorporated herein by reference in their entirety.

BACKGROUND OF THE INVENTION

1. Field of the Invention

The present invention relates to a slot machine.

2. Description of the Related Art

Conventionally, slot machines known as a type of gaming machines are constituted so as to: start games by players inserting coins or the like into the gaming machine; variably display columns of symbols in predetermined regions of the gaming machine while they are displayed in a stopped state after a predetermined period has elapsed; and award payout based on a combination of symbols in a stopped state.

In addition, the above slot machines are generally constituted to judge whether or not a winning combination allowed to award payout is established, based on whether or not a predetermined number of symbols of the same type (for example, "CHERRY" or "7") are arranged along a preset payline. In the conventional slot machine, in a case where a predetermined number or more of symbols of the same type are arranged, it has been a common routine to award payout based on the number of the aforementioned arranged symbols, regardless of the payout line.

Further, many of the conventional slot machines have been known which conduct two types of games, i.e., a basic game and a free game. The basic game is executed upon consumption of gaming values (such as coins or credits) corresponding to the amount of bet. On the other hand, the free game is executed without consuming gaming values corresponding to the amount of bet.

The basic game is switched to the free game when a predetermined condition is met. The condition includes a case in which, for example, a specific symbol is displayed in a stopped state during the basic game. The free game is switched to the basic game when a predetermined condition is met. The condition includes a case in which, for example, the free games are executed a predetermined number of times.

In the conventional slot machines, it has been a common routine to raise players' feeling of expectation for the free game by changing arrangement of symbols during the free game differently from that during the basic game. For example, U.S. Pat. No. 6,394,902-B1 describes a slot machine in which a total of fifteen symbols are displayed in three rows and five columns with the use of video reels. This slot machine changes symbol columns arranged on reels during the free game differently from that during the basic game, in which eight types of symbols are decreased to five. In this manner, a probability of awarding payout can be apparently increased during the free game.

In the aforementioned conventional slot machines, however, irrespective of whichever of the basic game and the free game is in progress, the symbols of different types have been randomly arranged in combination and sequential order. These slot machines determine the contents of the prize to be awarded, based on a combination of multiple symbols that have been arranged in a display device. Therefore, players are allowed to have the feeling of expectation only for random payout based on a combination of plural types of symbols that have been randomly arranged in the display device. Accordingly, a need exists for the advent of a slot machine which can offer new entertainability.

The present invention has been made in view of the above-described circumstance. It is an object of the present invention to provide a novel slot machine by enhancing entertainability associated with arrangement of the symbols during the free game.

SUMMARY OF THE INVENTION

A first aspect of the present invention is a slot machine including: a display device for displaying a symbol matrix display region in which plural types of symbols are displayed; a memory for storing data concerning a number of predetermined symbols arranged in the symbol matrix display region; and a processor for controlling the display device and the memory. The processor is programmed to: (a) execute a basic game; (b) rearrange the plural types of symbols in the symbol matrix display region during the basic game; (c) cumulatively store in the memory, the data concerning the number of the predetermined symbols from among the plural types of symbols, the predetermined symbols being rearranged in the symbol matrix display region during the basic game; (d) determine a number of times in executing a free game by executing a sub game by a number of times equal to the number of the predetermined symbols rearranged in the symbol matrix display region, by referring to the data concerning the number of the predetermined symbols stored in the memory; and (e) execute the free game based on the number of times determined in the itemized (d).

According to the first aspect of the present invention, upon rearrangement of the predetermined symbols during the basic game, the number of predetermined symbols having been rearranged is cumulatively stored, and the sub game is executed by the number of times equal to the aforementioned stored number. The number of times in executing the free game is then determined in accordance with the outcome of the sub game. Therefore, payout of the next free game cannot be predicted by visually confirming the number of predetermined symbol having been rearranged during the basic game but this slot machine allows players to raise expectations that payout would greatly increase and to enjoy predicting the payout of the free game during the free game, thereby enhancing entertainability.

A second aspect of the present invention is a slot machine constituted as set fourth below. In the first aspect, the slot machine further includes a control panel for receiving operation by a player. The processor is further programmed to: (f) determine an appearance frequency with which the predetermined symbol from among the plural types of symbols is rearranged in the symbol matrix display region during the basic game in accordance with an operation status of the control panel; and the processor, in the itemized (b), rearranges the plural types of symbols in the symbol matrix display region during the basic game so that the predetermined symbol is rearranged within a range of the appearance frequency determined in the itemized (f).

According to the second aspect of the present invention, when a predetermined part of the control panel such as a MAX-BET button or a side-BET button is operated during the basic game, a frequency is determined with which the predetermined symbol is rearranged, and the predetermined symbol is rearranged within a range of the determined frequency. The number of the predetermined symbols thus rearranged is cumulatively stored, and then, the sub game is executed by the number of times corresponding to the stored number. Therefore, players raise expectations for payout of the next free game by visually confirming the number of predetermined symbols rearranged during the basic game, so that this slot machine allows players, during the basic game, to have expectations for payout of the free game, thereby enhancing entertainability.

A third aspect of the present invention is a slot machine constituted as set forth below. In the second aspect, the processor, in the itemized (e), executes the free game based on a total number of times which is obtained by summing a predetermined number of times to the number of times in executing the free game that is determined in the itemized (d).

According to the third aspect of the present invention, the sub game is executed by the number of times equal to the number of times in rearranging the predetermined symbols, which has been cumulatively stored. The number of times in executing the free game, thus determined, is summed to the predetermined number of times, and thus, the free game is executed by a total number of times. For example, in a case where four is determined the number of times in executing the free game, which is determined by executing the sub game by the number of times equal to the number of times in rearranging the predetermined symbols, the number being cumulatively stored, while six is determined as the predetermined number of times, the free game is executed by ten times. Therefore, the predetermined number of times is summed to the number of times in executing the free game, which cannot be predicted from only the number of times in rearranging the predetermined symbols, so that this slot machine allows players to raise expectations for the number of times in executing the next free game, thereby enhancing entertainability during the basic game.

A fourth aspect of the present invention is a slot machine constituted as set fourth below. In the fourth aspect, the processor, in the itemized (d), determines the number of times in executing the free game by summing numbers of times in executing the free game that are determined in the sub games, respectively.

According to the fourth aspect of the present invention, the sub game is executed by the number of times equal to the number of times in rearranging the predetermined symbols, which has been cumulatively stored. However, the free game is executed by a total number of times which is obtained by cumulatively summing the number of times in executing the free game, which is determined in each sub game, to the predetermined number of times. For example, in a case where two is determined in the first sub game, as the number of times in executing the free game; one is determined in the second sub game, as the number of times in executing the free game; and six is determined as the predetermined number of times, the free game is executed by nine times. Therefore, the number of times is cumulatively summed to the predetermined number of times in executing the free game, by repeating the sub game, thereby increasing the number of times in executing the free game. Thus, this slot machine allows players to raise expectations for the number of times in executing the next free game as more sub games are executed, thereby enhancing entertainability.

A fifth aspect of the present invention is a slot machine including a display device for displaying a symbol matrix display region in which plural types of symbols are displayed; a memory for storing data concerning a number of predetermined symbols arranged in the symbol matrix display region; a control panel for receiving operation by a player; and a processor for controlling the display device and the memory. The processor is programmed to: (a) execute a basic game; (b) determine an appearance frequency with which the predetermined symbol from among the plural types of symbols is rearranged in the symbol matrix display region during the basic game in accordance with an operation status of the control panel; (c) rearrange the plural types of symbols in the symbol matrix display region during the basic game so that the predetermined symbol is rearranged within a range of the determined appearance frequency; (d) cumulatively store in the memory, the data concerning the number of the predetermined symbols from among the plural types of symbols, the predetermined symbols being rearranged in the symbol matrix display region during the basic game; (e) determine a number of times in executing a free game by executing a sub game by a number of times equal to the number of the predetermined symbols rearranged in the symbol matrix display region, by referring to the data concerning the number of the predetermined symbols stored in the memory; and (f) execute the free game based on the number of times determined in the itemized (e).

According to the fifth aspect of the present invention, an appearance frequency, with which the predetermined symbol is rearranged, depends on operation of a predetermined part of the control panel such as a MAX-BET button or a side-BET button during the basic game. The number of predetermined symbols rearranged within a range of the appearance frequency is cumulatively stored, and the sub game is executed by a number of times equal to the number thus stored. The number of times in executing the free game is determined in accordance with an outcome of the above sub game, so that payout of the next free game depends on the operation during each basic game. In this manner, this slot machine allows players to enjoy predicting payout of the free game during the basic game, thereby enhancing entertainability.

A sixth aspect of the present invention is a slot machine constituted as set fourth below. In the sixth aspect, the processor, in the itemized (f), executes the free game based on a total number of times which is obtained by summing a predetermined number of times to the number of times in executing the free game that is determined in the itemized (e).

According to the sixth aspect of the present invention, the sub game is executed the number of times equal to the cumulatively-stored number of times in rearranging the predetermined symbols with an appearance frequency which depends on the operation of the predetermined part of the operation panel during the basic game. The thus-determined number of times in executing the free game is summed to the predetermined number of times, and the free game is then executed by a total number of times. For example, in a case where four is determined as the number of times in executing the free game, by executing the sub game by the number of times equal to the cumulatively-stored number of times in rearranging the predetermined symbols, while six is determined as the predetermined number of times in executing the free game, the free game is executed by ten times. Therefore, the predetermined number of times is summed to the number of times in executing the free game, which cannot be predicted from only the number of times in rearranging the predetermined symbols, so that this slot machine allows players to raise expectations for the number of times in executing the next free game, thereby enhancing entertainability during the basic game.

A seventh aspect of the present invention is a slot machine constituted as set fourth below. In the seventh aspect, the processor, in the itemized (e), determines the number of times in executing the free game by summing numbers of times in executing the free game that are determined in the sub games, respectively.

According to the seventh aspect of the present invention, the sub game is executed the number of times equal to the cumulatively-stored number of times in rearranging the predetermined symbols with an appearance frequency which depends on the operation of the predetermined operation panel during the basic game. However, the free game is executed by a total number of times which is obtained by cumulatively summing the number of times in executing the free game, which is determined in each sub game, to the predetermined number of times. For example, in a case where two is determined in the first sub game, as the number of times in executing the free game; one is determined in the second sub game, as the number of times in executing the free game; and six is determined as the predetermined number of times, the free game is executed by nine times. Therefore, the number of times is cumulatively summed to the predetermined number of times in executing the free game, by repeating the sub game, thereby increasing the number of times in executing the free game. Thus, this slot machine allows players to raise expectations for the number of times in executing the next free game, thereby enhancing entertainability.

An eighth aspect of the present invention is a slot machine including a display device for displaying a symbol matrix display region in which plural types of symbols are displayed; a memory for storing data concerning a number of predetermined symbols arranged in the symbol matrix display region; a control panel for receiving operation by a player; and a processor for controlling the display device and the memory. The processor is programmed to: (a) execute a basic game; (b) determine an appearance frequency with which the predetermined symbol from among the plural types of symbols is rearranged in the symbol matrix display region during the basic game in accordance with an operation status of the control panel; (c) rearrange the plural types of symbols in the symbol matrix display region during the basic game so that the predetermined symbol is rearranged within a range of the determined appearance frequency; (d) cumulatively store in the memory, the data concerning the number of the predetermined symbols from among the plural types of symbols, the predetermined symbols being rearranged in the symbol matrix display region during the basic game; (e) determine a number of times in executing a free game by executing a sub game by a number of times equal to the number of the predetermined symbols rearranged in the symbol matrix display region, by referring to the data concerning the number of the predetermined symbols stored in the memory and by summing numbers of times in executing the free game that are determined in the sub games, respectively; and (f) execute the free game based on a total number of times which is obtained by summing a predetermined number of times to the number of times in executing the free game that is determined in the itemized (e).

According to the eighth aspect of the present invention, an appearance frequency, with which the predetermined symbol is rearranged, depends on operation of a predetermined part of the control panel such as a MAX-BET button or a side-BET button during the basic game. The number of predetermined symbols rearranged within a range of the appearance frequency is cumulatively stored, and the sub game is executed by a number of times equal to the number thus stored. The free game is executed by a total number of times which is obtained by summing the number of times in executing the free game, which is determined in the sub game, to the predetermined number of times in executing the free game. Specifically, the free game is executed by a total number of times which is obtained by cumulatively summing numbers of times in executing the free game, which are determined in the sub games, respectively, to the predetermined number of times. For example, in a case where two is determined in the first sub game, as the number of times in executing the free game; one is determined in the second sub game, as the number of times in executing the free game; and six is determined as the predetermined number of times in executing the free game, the free game is executed by nine times. Therefore, the number of times is cumulatively summed to the predetermined number of times in executing the free game, by repeating the sub game, thereby increasing the number of times in executing the free game. Thus, this slot machine allows players to raise expectations for the number of times in executing the next free game as more sub games are executed, thereby enhancing entertainability.

DESCRIPTION OF THE PREFERRED EMBODIMENTS

Figure 1:
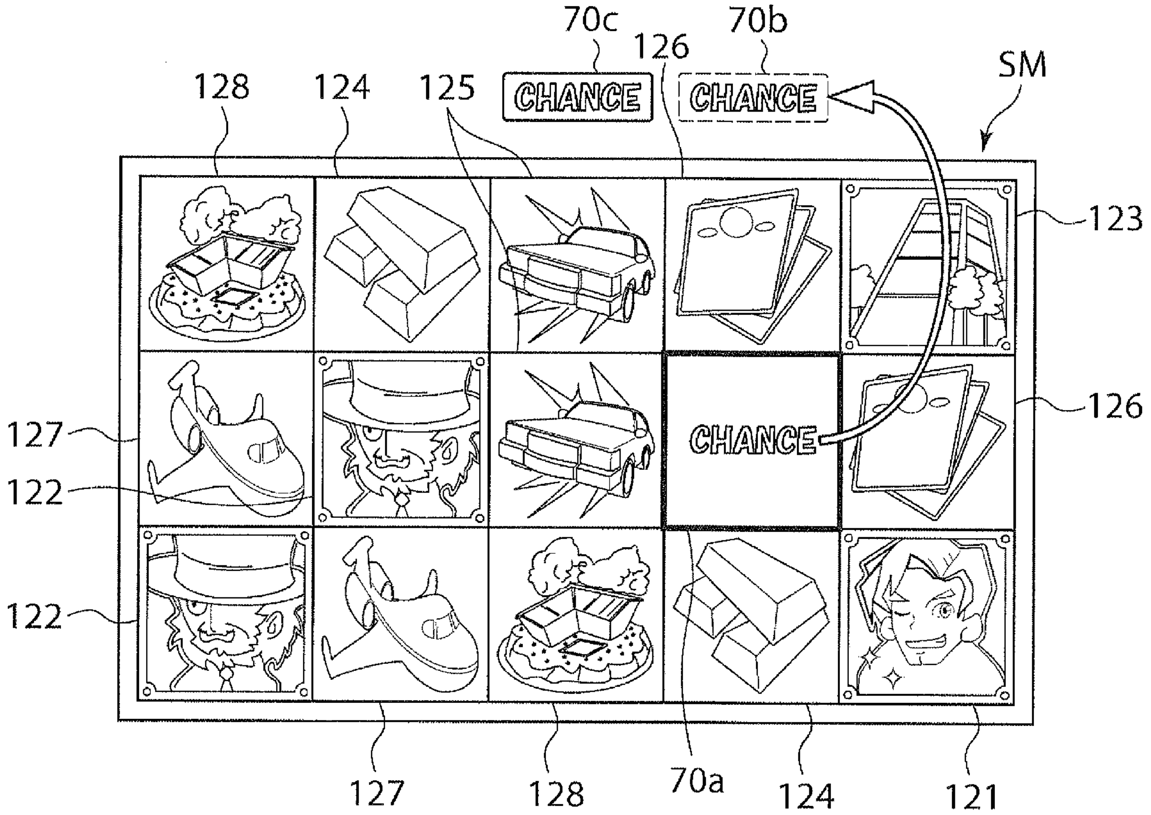
FIG. 1 is a view showing an exemplary symbol matrix during a basic game according to a first embodiment.

First, a slot machine 10 according to a first embodiment will be described with referring to the drawings. The slot machine according to the first embodiment is a so-called video slot machine, which has an image display panel such as a liquid crystal display and executes a game by displaying images of various symbols on the image display panel.

FIG. 1 is a view showing an exemplary symbol matrix during a basic game according to the first embodiment. The slot machine 10 according to the present invention executes either one of two modes of games, i.e., a basic game and a free game. The basic game is executed upon consuming a gaming value corresponding to the amount bet by a player. The free game is executed without consuming a gaming value in a case where a predetermined condition is met during the basic game. During the basic game, the slot machine 10 is allowed to: detect operation of a control panel including a MAX-BET button 27 or the like; determine based on the operation of the control panel, a frequency with which a symbol "CHANCE 70*a*" serving as a predetermined symbol is rearranged in a symbol matrix element SM; rearrange the symbol "CHANCE 70*a*" within a range of the determined frequency; store in a memory data concerning the number of rearranged symbols "CHANCE 70*a*"; display an icon "CHANCE 70*c*" on a lower image display panel 16 based on the data concerning the number of rearranged symbols "CHANCE 70*a*" stored above; and determine the number of times in executing a sub game and the number of times in executing the free game. While the slot machine 10 is of a stand-alone type, which is not connected to a network, the present invention is also applicable to a networked slot machine.

As shown in FIG. 1, elements of the symbol matrix SM are displayed on the lower image display panel 16 described later, included in the slot machine 10. The elements of the symbol matrix SM are made up of a total of fifteen symbols in three rows and five columns.

In the first embodiments of the present invention, any of symbols "main character 121", "sub character 122", "office building 123", "gold bullion 124", "car 125", "stock certificate 126", "jet 127", "villa 128", and "CHANCE 70*a*" are rearranged in the elements of symbol matrix SM. A payout is determined based on the number of symbols of respective types rearranged in the elements of the symbol matrix SM.

As shown in FIG. 1, during the basic game, when the symbol "CHANCE 70*a*" is rearranged upon rearranging the symbols, "main character 121", "sub character 122", "office building 123", "gold bullion 124", "car 125", "stock certificate 126", "jet 127", "villa 128", and "CHANCE 70*a*" in any of the elements of the symbol matrix SM, icons "CHANCE 70*b*" and "CHANCE 70*c*" are cumulatively displayed in a region on the lower image display panel 16 other than a region in which the elements of the symbol matrix SM are displayed. These icons are displayed so as to visualize the number of symbols "CHANCE 70*a*" which are rearranged until a next free game is started. In this case, the icon "CHANCE 70*b*" corresponding to the symbol "CHANCE 70*a*" that is rearranged during the current basic game is displayed in a blinking state at an upper portion of the elements of the symbol matrix SM so as to visualize rearrangement of the symbol "CHANCE 70*a*". The icon "CHANCE 70*c*" indicates the presence of the symbol "CHANCE 70*a*" that has been rearranged during the previous basic game.

Figure 2:
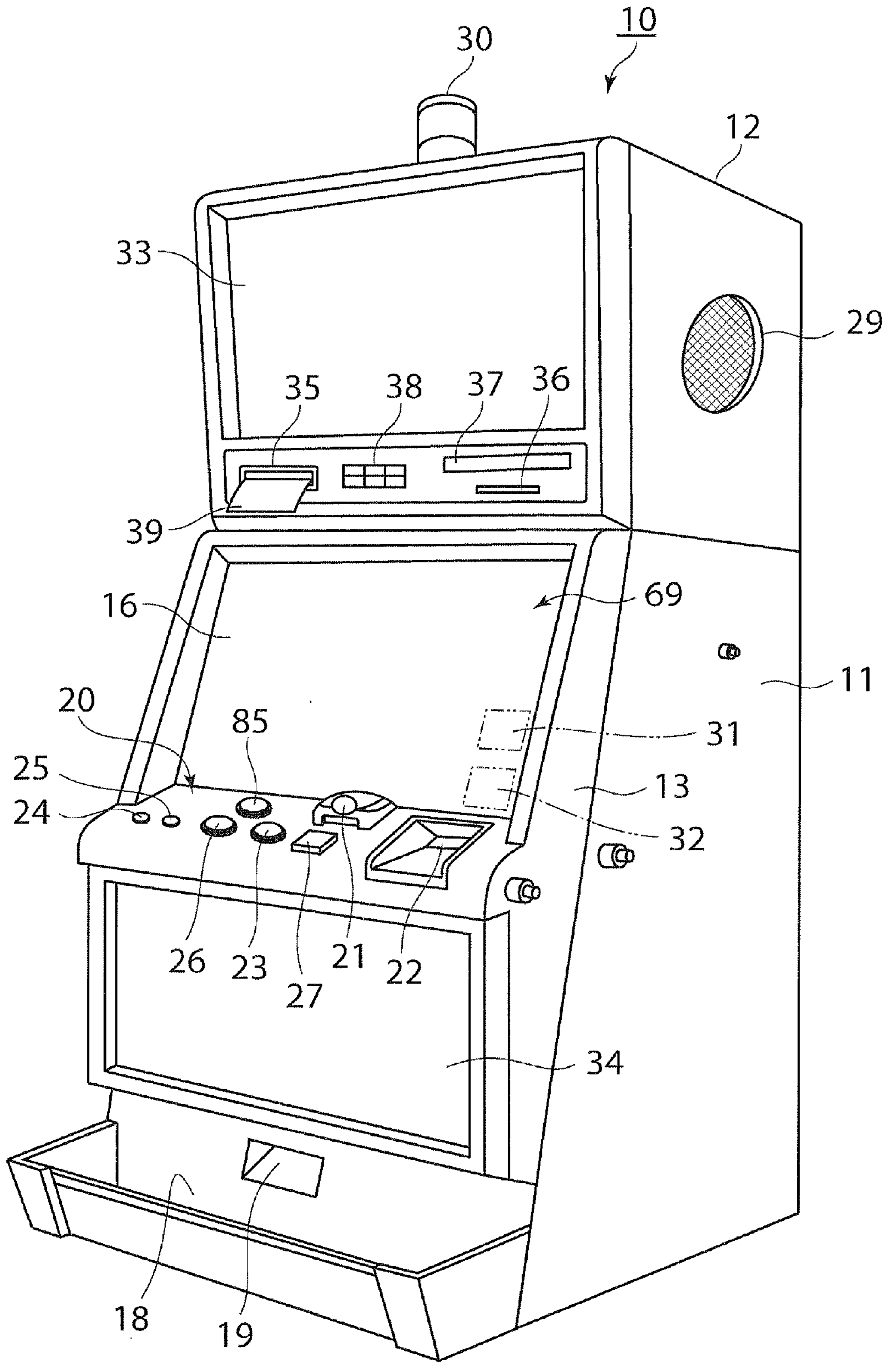
FIG. 2 is a perspective view schematically showing a frame format of a slot machine according to the first embodiment.

FIG. 2 is a view schematically depicting a frame format of an appearance of the slot machine according to the first embodiment. The gaming media used in the slot machine 10 include coins, bills, or electronic value information equivalent thereto. In the present invention, however, the gaming media are not limitative thereto in particular, and can include medals, tokens, electric money, and tickets, for example. The above tickets are not limitative in particular, and can include barcode-attached tickets or the like, as described later, for example.

The slot machine 10 is provided with a cabinet 11, a top box 12 installed on an upper side of the cabinet 11, and a main door 13 provided on a front surface of the cabinet 11.

The lower image display panel 16 serving as a display device is provided in front of the main door 13. The lower image display panel 16 is provided with a liquid crystal panel, which displays the fifteen elements of the symbol matrix SM in three rows and five columns. A single symbol is arranged in each of the elements of the symbol matrix SM.

A credit amount display section 31 of the lower image display panel 16 displays the number of coins credited by way of an image. A payout amount display unit 32 displays by way of an image the number of, for example, coins to be paid if a predetermined number or more symbols of respective types are rearranged in the elements of the symbol matrix SM. The lower image display panel 16 is provided with a touch panel 69 at a player's side.

Provided on a lower side of the lower image display panel 16 are a control panel 20 having a plurality of buttons 23 to 27 through which command regarding the process of the game will be input by a player, a coin receiving slot 21 for receiving coins into the cabinet 11, and a bill validator 22.

On the control panel 20, a start button 23, a change button 24, a cashout button 25, a 1-BET button 26, a MAX-BET button 27, and a side-BET button 85 are provided. The start button 23 is intended for entering a command for starting the game. The change button 24 is intended for use in asking an attendant of the gaming facility for change. The cashout button 25 is intended for entering a command for paying out the credited coins to a coin tray 18 through a coin payout exit 19.

The 1-BET button 26 is intended for entering a command for betting one coin among the credited coins on the game. The MAX-BET button 27 is intended for entering a command for betting the upper number (50 in this embodiment) of coins that can be bet per game among the credited coins on the game. The side-BET button 85 is intended for entering a command for betting coins on the game if players desire to place a bet on one more game.

The bill validator 22 validates whether or not a bill is legitimate and accepts a legitimate bill into the cabinet 11. The bill validator 22 may be configured so that a barcode-attached ticket 39 described later is readable thereby. Provided on a lower front surface of the main door 13, that is, at a lower part of the control panel 20, is a berry glass 34 on which characters of the slot machine 10 and the like are depicted.

On a front surface of the top box 12, an upper image display panel 33 is provided. The upper image display panel 33 has a liquid crystal panel, which displays images for introducing the game contents or explaining game rules, for example.

Also, on the top box 12, a speaker 29 and a lamp 30 are provided. On a lower side of the upper image display panel 33, a ticket printer 35, a card reader 36, a data display unit 37, and a key pad 38 are provided. The ticket printer 35 prints on the ticket, a barcode having encoded thereon data such as the credit amount, the date and time, and the identification number of the slot machine 10, and outputs the printed ticket as the barcode-attached ticket 39. The player can play the game on another slot machine with the barcode attached ticket 39 by causing this slot machine to read the barcode attached ticket 39. Alternatively, the player can exchange the barcode-attached ticket 39 with the bills or the like at a predetermined place (at a cashier inside a casino, for example) of the gaming facility.

The card reader 36 reads data from and writes data into a smart card. The smart card is to be owned by the player, which stores data for identifying the player or data regarding the log of games executed by the player, for example. The smart chard may store data corresponding to coins, bills, or a credit. As an alternative of a smart card, a magnetic stripe card may be employed. The data display 37 is made up of a fluorescent display and the like, and displays the data read by the card reader or the data input by the player through the key pad 38, for example. The key pad 38 inputs data and commands regarding the ticket issuance or the like.

Figure 3:
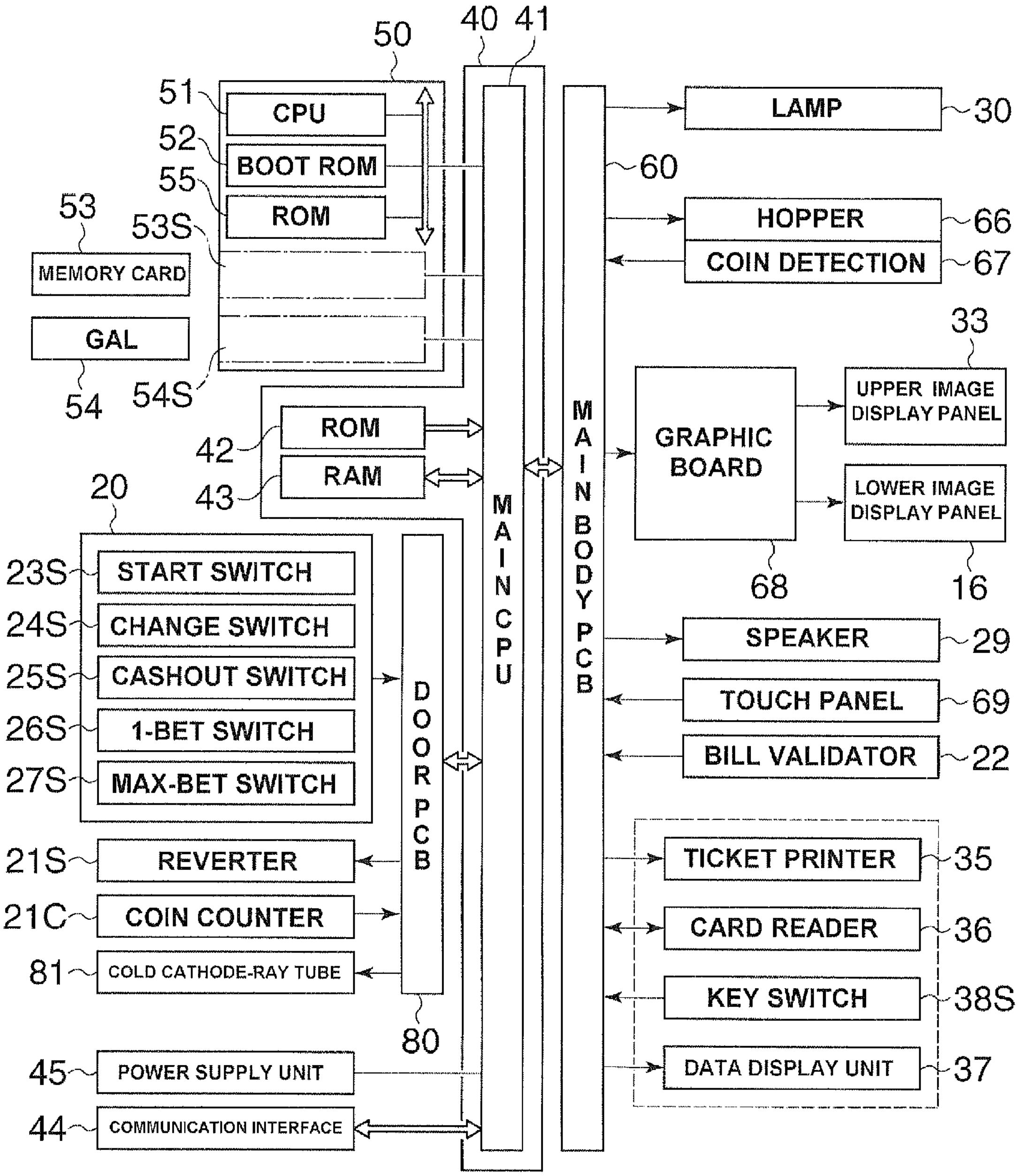
FIG. 3 is a block diagram depicting an internal construction of the slot machine shown in FIG. 2.

FIG. 3 is a block diagram depicting the internal construction of the slot machine shown in FIG. 2. A gaming board 50 includes: a CPU (Central Processing Unit) 51, a ROM (Read Only Memory) 55 and a boot ROM 52 interconnected by an internal bus; a card slot 53S corresponding to a memory card 53; and an IC socket 54S corresponding to a GAL (Generic Array Logic) 54.

The memory card 53 is formed of a nonvolatile memory such as Compact Flash (registered trademark) and stores game programs. The game programs include a symbol selection program. The aforementioned symbol selection program is intended for determining the symbols to be rearranged in the elements of the symbol matrix SM. The aforementioned symbol selection program includes symbol weighing data respectively corresponding to plural types of payout ratios (80%, 84%, and 88%, for example). The symbol weighting data is indicative of the correspondence relationship between the respective symbols and one or more random numeric values which come under a predetermined numerical range (0 to 255). The payout ratio is determined according to the payout-ratio setting data output from the GAL 54. The symbols to be rearranged in the elements of the symbol matrix SM are determined depending upon the symbol weighing data corresponding to this payout ratio. Further, the game programs include table data indicating the correspondence relationship between each of the symbols and a payout.

Also, the card slot 53S is configured to allow the memory card 53 to be inserted thereinto or ejected therefrom, and is connected to a mother board 40 through IDE pass. Accordingly, the memory card 53 can be ejected from the card slot 53S, other game programs and other game system programs can then be written into the memory card 53, and further, the memory card 53 can be inserted into the card slot 53S, thereby allowing the player to change the types and contents of games executed in the slot machine 10. The game program includes data concerning a game progress. Furthermore, the game program includes image data or sound data to be output during the game. The image data include, for example, image data indicative of the symbol matrix.

The GAL 54 is a type of a PLD having a fixed OR array structure. The GAL 54 includes plural input ports and plural output ports. Where predetermined data is input to the input port, the GAL 54 outputs data corresponding to the aforementioned data from the output port. The data output from this output port is equivalent to the aforementioned payout-ratio setting data. Further, the IC socket 54S is configured to allow the GAL 54 to be attached thereto and detached therefrom, and is connected to the mother board 40 by a PCI bus. Accordingly, the GAL can be replaced with the replacement GAL 54 to change the payout-ratio setting data.

The CPU 51, the ROM 55, and the boot ROM 52 interconnected by the internal bus are connected to the mother board 40 by the PCI bus. The PCI bus serves to transmit signals between the mother board 40 and the gaming board 50 and supply power from the mother board 40 to the gaming board 50.

The mother board 40 is constructed using a general-purpose mother board commercially available (a printed circuit board on which essential parts of a personal computer are mounted) and includes: a main CPU (Central Processing Unit) 41, a ROM (Read Only Memory) 42; a RAM (Random Access Memory) 43; and a communication interface 44. The main CPU 41 functions as a processor for controlling a display device and memory according to the embodiment of the present invention.

The ROM 42 is made up of a memory device such as a flash memory and stores thereon a program such as BIOS (Basic Input/Output System) executed by the main CPU 41, and permanent data. When the BIOS is executed by the main CPU 41, processing of initializing predetermined peripheral devices is carried out and processing of capturing game programs and game system programs stored in the memory card 53 through the gaming board 50 is started. In the present invention, the contents of the ROM 42 may be rewritable or not.

The RAM 43 stores data and a program used when the main CPU 41 is activated. The RAM 43 can also store game programs. The RAM 43 further stores data concerning the credit amount, the number of coin-in or coin-out for one game, and the like.

Both a main body PCB (Printed Circuit Board) 60 and a door PCB 80, which will be described later, are connected to the mother board 40 by USB. A power supply unit 45 is also connected to the mother board 40.

Connected to the main body PCB 60 and the door PCB 80 are: equipment and devices which generate input signals to be input to the main CPU 41; and equipment and devices of which operations are controlled by a control signal output from the main CPU 41. The main CPU 41 executes a game program stored in the RAM 43 based on an input signal having been input to the main CPU 41 and performs a predetermined computational process, thereby storing results thereof in the RAM 43 or transmitting a control signal to each of equipment and devices as a control process therefor.

A lamp 30, a hopper 66, a coin detecting section 67, a graphic board 68, a speaker 29, a touch panel 69, the bill validator 22, the ticket printer 35, the card reader 36, a key switch 38S, and the data display unit 37 are connected to the main body PCB 60. The lamp 30 is lit up in a predetermined pattern based on a control signal output from the main CPU 41.

The hopper 66 is installed in the cabinet 11 and pays out a predetermined number of coins from the coin payout exit 19 to the coin tray 18 based on a control signal output from the main CPU 41. The coin detecting section 67 is installed inside the coin payout exit 19 and outputs an input signal to the main CPU 41 upon detecting that a predetermined number of coins have been paid out from the coin payout exit 19.

The graphic board 68 controls, based on a control signal output from the main CPU 41, images to be displayed on the upper image display panel 33 and the lower image display panel 16. The credit amount stored in the RAM 43 is displayed on a credit amount display section 31 (see FIG. 2) of the lower image display panel 16. The number of coins to be paid out is displayed at a payout amount display section 31 (see FIG. 2) of the lower image display panel 16. The graphic board 68 is equipped with a VDP (Video Display Processor) which generates image data based on a control signal output from the main CPU 41 and a video RAM which temporarily stores image data generated by the VDP, and the like. The image data used in generating image data with VDP is contained in the game program read from the memory card 53 and stored in the RAM 43.

A touch panel 69 is provided at a player's side of the lower image display panel 16, and the main CPU 41 receives a signal generated by player's touch of the touch panel 69 and based on this signal, localizes a position on the lower image display panel 16 where the player touched. In the present invention, it is sufficient if this touch panel 69 be of an analog resistive touch type, a matrix resistive touch type, or the like, without being limitative thereto.

The bill validator 22 validates whether or not a bill is legitimate and accepts a legitimate bill into the cabinet 11. Upon accepting a legitimate bill, the bill validator 22 outputs an input signal to the main CPU 41 based on the amount of the bill. The main CPU 41 stores in the RAM 43 the credit amount corresponding to the amount of bills transmitted by the input signal.

Based on a control signal output from the main CPU 41, the ticket printer 35 prints on a ticket a barcode having encoded thereon data such as the credit amount, data and time, and the identification number of the slot machine 10 stored in the RAM 43. Further, this printer outputs the printed ticket as a barcode-attached ticket 39. The card reader 36 transmits to the main CPU 41 the data read from the smart card and writes the read data onto the smart card, based on a control signal from the main CPU 41. The key switch 38S is provided on the key pad 38, and outputs a predetermined input signal to the main CPU 41 when the player operates the key pad 38. The data display 37, based on a control signal output from the main CPU 41, displays the data read by the card reader 36 and the data input by the player through the key pad 38.

The control panel 20, a reverter 21S, a coin counter 21C, and a cold cathode tube 81 are connected to the door PCB 80. The control panel 20 is provided with: a start switch 23S corresponding to the start button 23; a change switch 24S corresponding to the change button 24; a cashout switch 25S corresponding to a cashout button 25; a 1-BET switch 26S corresponding to a 1-BET button 26; a MAX-BET switch 27S corresponding to the MAX-BET button 27; and a side-BET switch 85S corresponding to the side-BET switch 85. When the player operates the buttons 23 to 27 and 85, the corresponding switches 23S to 27S and 85S output input-signals to the main CPU 41, respectively.

The coin counter 21C is provided inside the coin receiving slot 21, and validates whether or not a legitimate coin is inserted into the coin receiving slot 21. Those other than the legitimate coins are discharged from the coin payout exit 19. The coin counter 21C outputs an input signal to the main CPU 41 when a legitimate coin is detected.

The reverter 21S operates based on a control signal output from the main CPU 41 and distributes coins recognized as being legitimate by the coin counter 21C into a cash box (not shown in the drawings) or the hopper 66 which is arranged in the slot machine 10. In other words, when the hopper 66 is filled with coins, legitimate coins are distributed by the reverter 21S into the cash box. On the other hand, when the hopper 66 is not filled with coins, legitimate coins are distributed into the hopper 66. The cold cathode tube 81 functions as a backlight installed on rear face side of each of the lower image display panel 16 and the upper image display panel 33, and is lit up based on a control signal output from the main CPU 41.

Figure 4A:
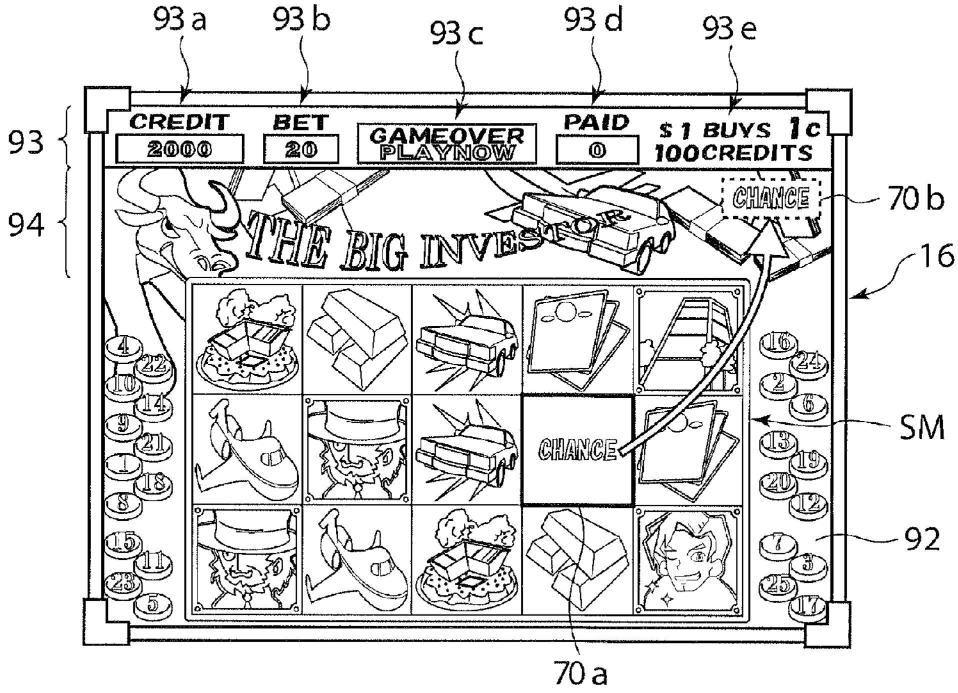
FIG. 4A is a view showing an exemplary image displayed during the basic game in the slot machine shown in FIG. 2.

FIGS. 4A to 7B are views each showing an exemplary image displayed in the slot machine shown in FIG. 2 according to a second embodiment. FIGS. 4A and 4B are views each showing an exemplary image displayed during a basic game in the slot machine shown in FIG. 2.

As shown in FIG. 4A, the lower image display panel 16 is made up of a display region 92, an information display section 93, an effect image display section 94, and the like. The elements of the symbol matrix SM are displayed in the display region 92. The information display section 93 is arranged upwardly of the display region 92 and is made up of a credit amount display section 93*a*, a BET amount display section 93*b*, a character information display section 93*c*, a PAID amount display section 93*d*, and a charge display section 93*e*.

The number of coins currently credited is displayed at the credit amount display section 93*a* while the number of coins bet on one game is displayed at the BET amount display section 93*b*. The character information indicative of a current status of the game is displayed at the character information display section 93*c*. The characters of "PLAYNOW" are displayed during the play of the game, whereas the characters of "GAMEOVER" are displayed during the intervals between the plays of the game. The number of coins that have been successfully obtained in one game is displayed at the PAID amount display section 93*d*, whereas a conversion value of the credit amount based on a predetermined charge is displayed at the charge display section 93*e*.

The effect image display section 94 displays effect images according to a type of the present slot game. In other words, the effect image display section 94 displays different effect images between the basic and free games.

Any of symbols, "main character 121", "sub character 122", "office building 123", "gold bullion 124", "car 125", "stock certificate 126", "jet 127", "villa 128", and "CHANCE 70*a*" are rearranged in the elements of the symbol matrix SM on the lower image display panel 16. A payout is determined based on the number of these symbols rearranged in the elements of the symbol matrix SM. It should be noted that the symbol "CHANCE 70*a*" in this embodiment corresponds to "a predetermined symbol" set forth in Claims.

Figure 4B:
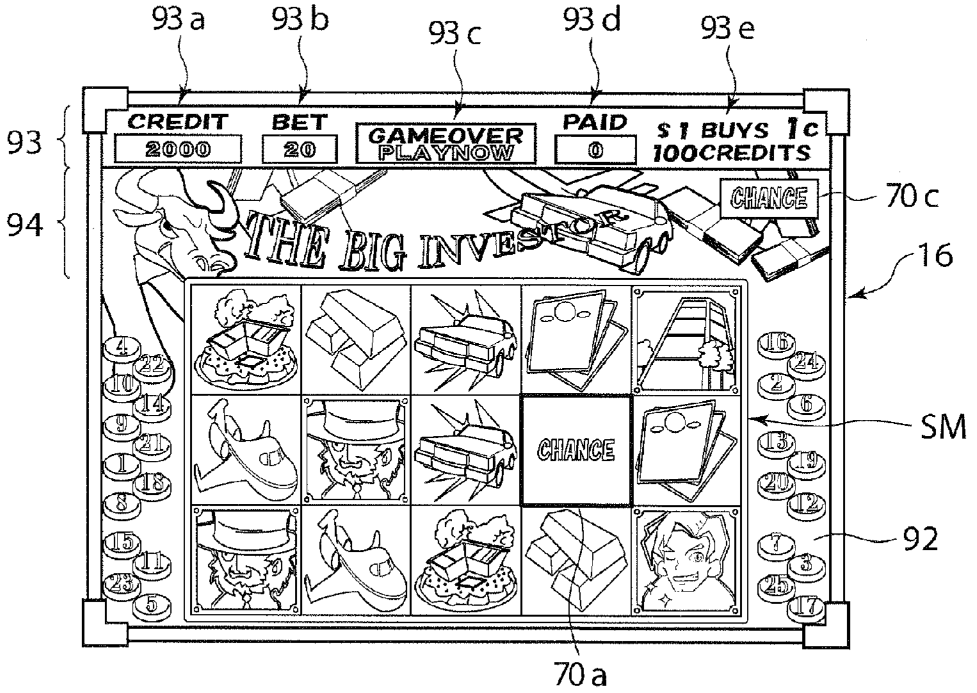
FIG. 4B is a view showing an exemplary image displayed during the basic game in the slot machine shown in FIG. 2.

During the basic game, the symbols, "main character 121", "sub character 122", "office building 123", "gold bullion 124", "car 125", "stock certificate 126", "jet 127", "villa 128", and "CHANCE 70*a*" are rearranged in any of the elements of the symbol matrix SM. When the symbol "CHANCE 70*a*" is rearranged in this manner, the icon "CHANCE 70*b*" is displayed in a blinking state at the effect image display section 94 on the lower image display panel 16. This icon is displayed so as to visualize the number of symbols "CHANCE 70*a*" which have been rearranged until the next free game is started. As shown in FIG. 4B, after a predetermined period has elapsed, the icon is switched from "CHANCE 70*b*" to "CHANCE 70*c*" which is defined as an ordinary display. The display of icon may be set in a blinking state during an effect display or may be switched in an ordinary state when the effect display is completed.

Figure 5A:
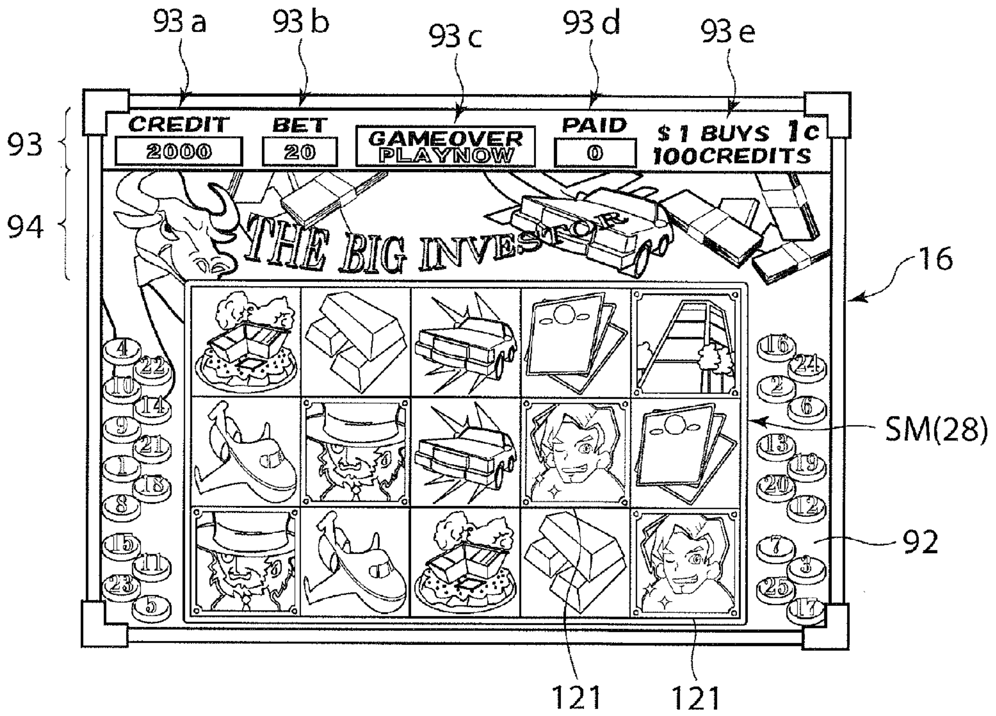
FIG. 5A is a view showing an exemplary image displayed during the basic game in the slot machine shown in FIG. 2.
Figure 5B:
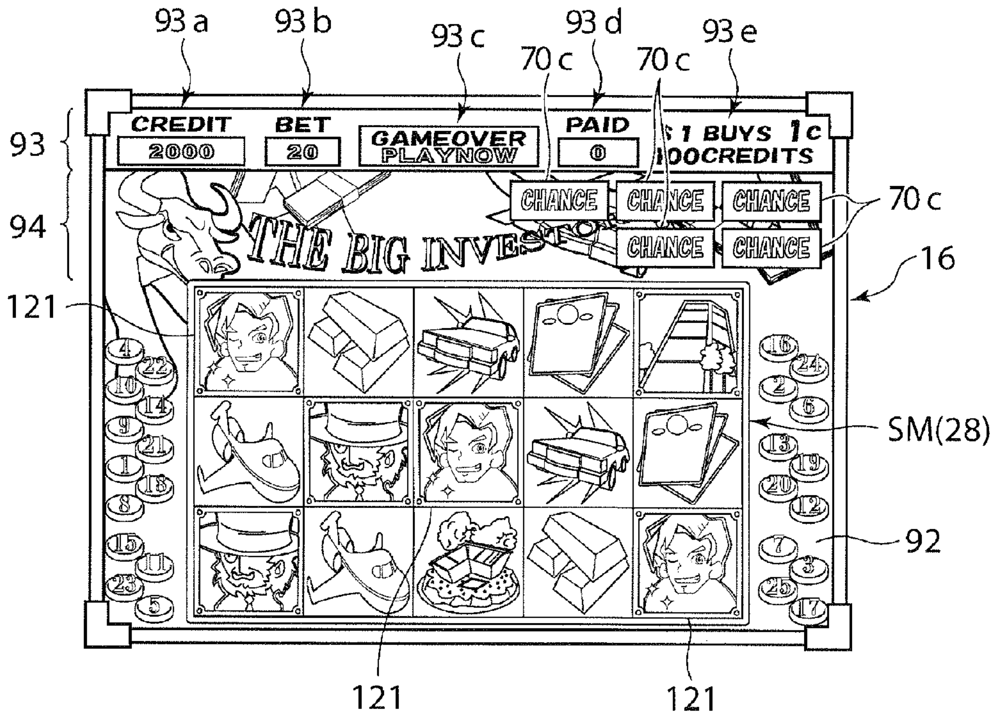
FIG. 5B is a view showing an exemplary image displayed during the basic game in the slot machine shown in FIG. 2.

FIGS. 5A and 5B are views each showing an exemplary image displayed during the basic game in the slot machine shown in FIG. 2, relating to determination of start of the free game. As shown in FIG. 5A, the display region 92 displays the elements of the symbol matrix SM. The free game is not started unless three or more symbols "main character 121" are displayed in the elements of the symbol matrix SM during the basic game.

As shown in FIG. 5B, when three or more symbols "main characters 121" are displayed in the elements of the symbol matrix SM, the start of the free game is determined. At this time, the number of times in executing the free game from now on is also determined. The effect image display section 94 displays the icon "CHANCE 70*c*" indicative of the number of symbols "CHANCE 70*a*" that have been rearranged during a period from completion of the previous free game to start of the next free game to be executed from now on.

Figure 6A:
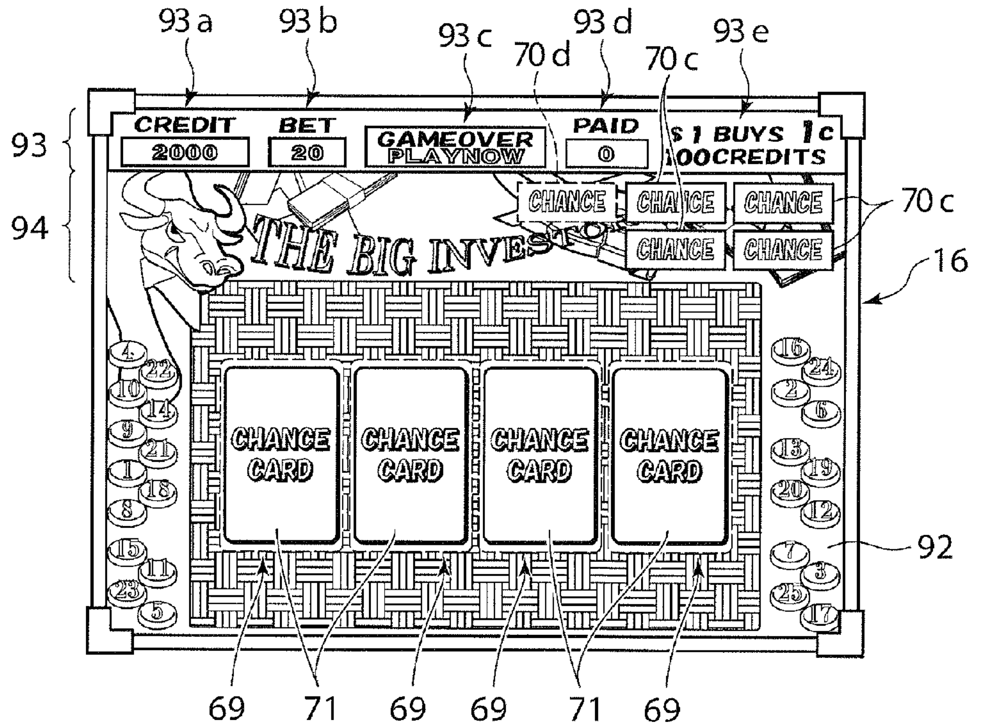
FIG. 6A is a view showing an exemplary image displayed during a free game in the slot machine shown in FIG. 2.
Figure 6B:
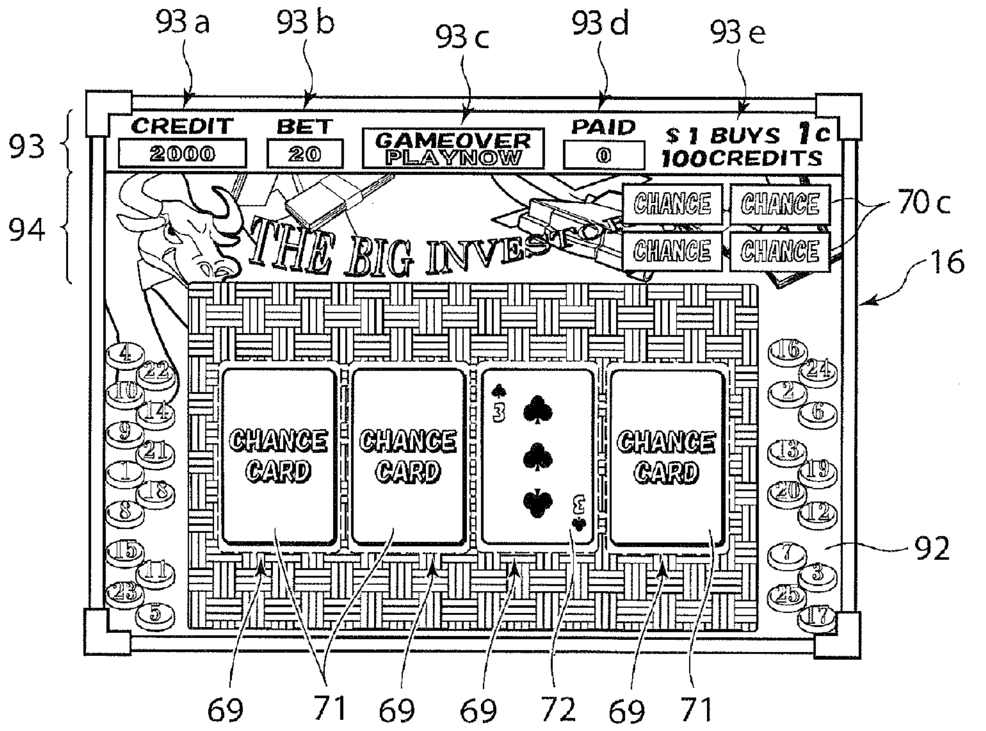
FIG. 6B is a view showing an exemplary image displayed during the free game in the slot machine shown in FIG. 2.

FIGS. 6A and 6B are views each showing an exemplary image displayed in the slot machine 10 during the free game. As shown in FIG. 6A, the display region 92 displays a sub game screen, and the sub game is executed by number of times corresponding to the number of the icons "CHANCE 70*c*" and "CHANCE 70*d*" displayed on the effect image display section 94. In this case, the sub game is executed once per icon "CHANCE". During execution of the sub game corresponding to the icon "CHANCE", the single icon "CHANCE 70*d*" is displayed in a blinking state so as to render the player visually recognize that the free game is reliably executed correspondingly to the number of icons "CHANCE" that have been rearranged during the basic game. The icon "CHANCE 70*d*" then disappears upon execution of the corresponding sub game. In the sub game executed above, the player arbitrarily selects one card from among four cards displayed in a face down state on the display region 92, and the number of times in executing the free game is determined according to a type of the selected card. In this point, the player's selection of the card is carried out by detecting the position of the touch panel 69 where the player touched.

As shown in FIG. 6B, the card selected by the player is displayed in a face up state on the display region 92 so as to display the type of the selected card. In this case, the determination may be made so that the number on the selected card is directly used as the number of times in executing the free game or may be made based on a table that is intended to determine the number of times in executing the free game depending on a type of each card. Further, the type of the selected card may be determined using random numbers based on a program previously stored in the RAM 43. The display region 92 still displays the four icons "CHANCE 70*c*", so that the similar sub game is executed four times in succession.

Figure 7A:
FIG. 7A is a view showing an exemplary image displayed during the free game in the slot machine shown in FIG. 2.
Figure 7B:
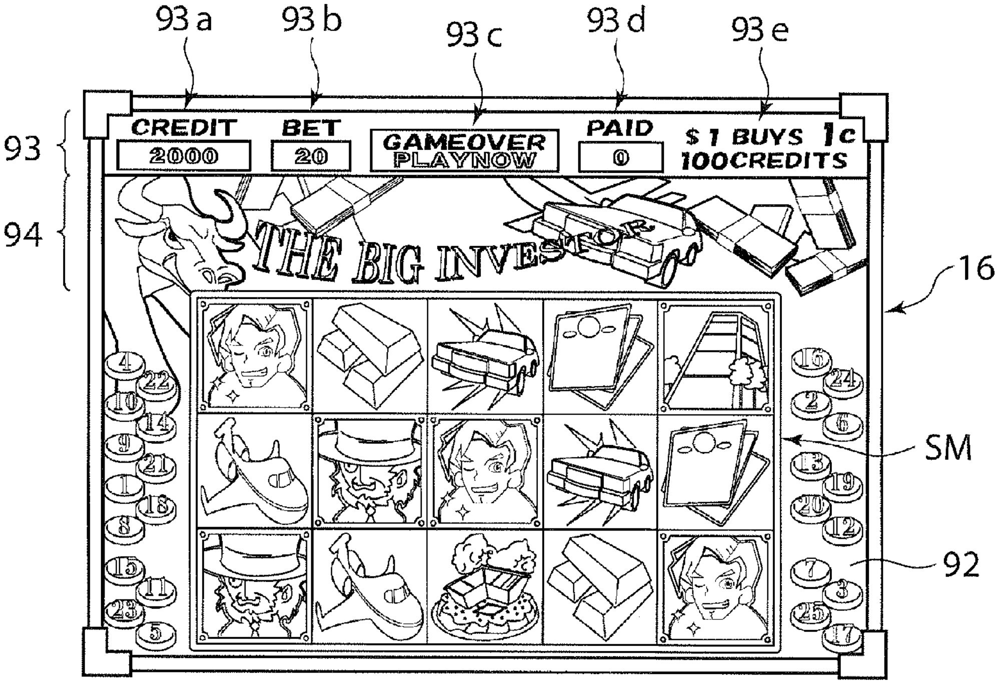
FIG. 7B is a view showing an exemplary image displayed during the free game in the slot machine shown in FIG. 2.

FIGS. 7A and 7B are views each showing an exemplary image displayed during the free game in the slot machine 10 shown FIG. 2. When the number of times in executing the free game is determined according to the sub game, the upper image display panel 33 displays the free-game number display image 90*a* indicative of the remaining number of times in executing the free game. In this case, the free-game-number display image 90*b* of "15FREE GAME" is displayed indicating that fifteen free games still remain.

As shown in FIG. 7B, the display region 92 displays the elements of the symbol matrix SM, in which the icons are rearranged without consuming gaming values, respectively, and the amount of gaming value to be paid out is determined depending on the number of respective types of icons that have been rearranged.

Next, a process executed in the slot machine 10 according to the first embodiment, will be described in detail with reference to the drawings. The main CPU 41 controls the progress of a game by reading out and executing the game program.

Figure 8:
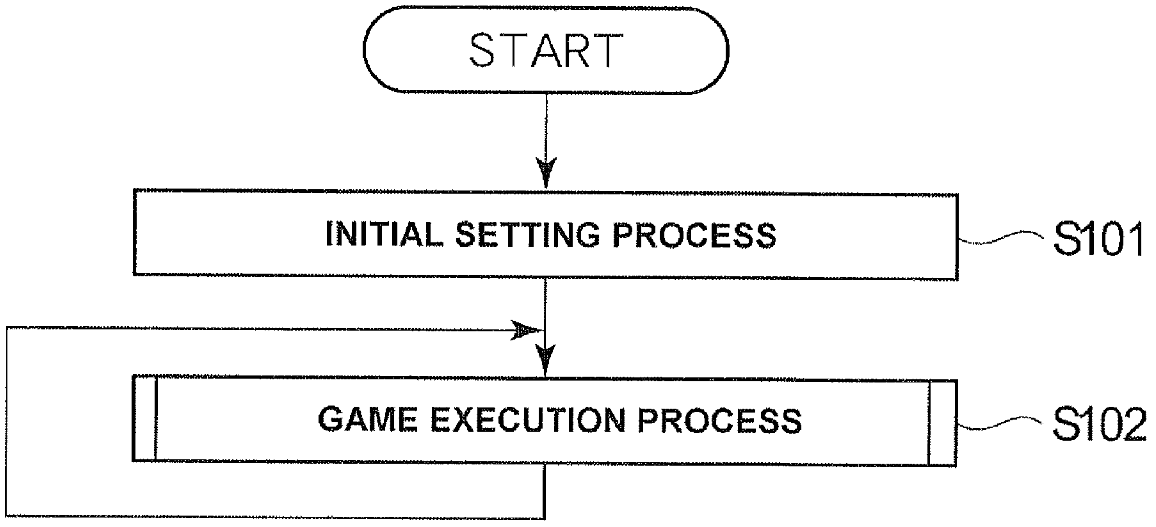
FIG. 8 is a flowchart showing a subroutine of a main process.

FIG. 8 is a flowchart showing a subroutine of a main process. In the main process, first, when a power switch is turned on (that is, when power is supplied), a mother board 40 and a gaming board 50 are activated respectively, so that the CPU 51 executes an initial setting process (step S101). In this initial setting process, the main CPU 41 executes the BIOS stored in the ROM 42, decompresses, in the RAM 43, compressed data included in the BIOS, executes the BIOS decompressed in the RAM 43, and performs diagnosis and initialization of each of the peripheral devices. The main CPU 41 writes game programs or the like from the ROM 42 into the RAM 43, and retrieves data for setting a payout ratio and country-identification information. The main CPU 41 also performs an authentication process for each program during execution of the initial setting process.

Next, the main CPU 41 performs a game execution process described later with reference to FIG. 9 (step S102). In this game execution process, the main CPU 41 sequentially reads and executes the game programs or the like from the ROM 42. By performing this game execution process, the slot machine according to the first embodiment 10 executes the game. The game execution process is repeatedly performed while power is supplied to the slot machine 10.

Figure 9:
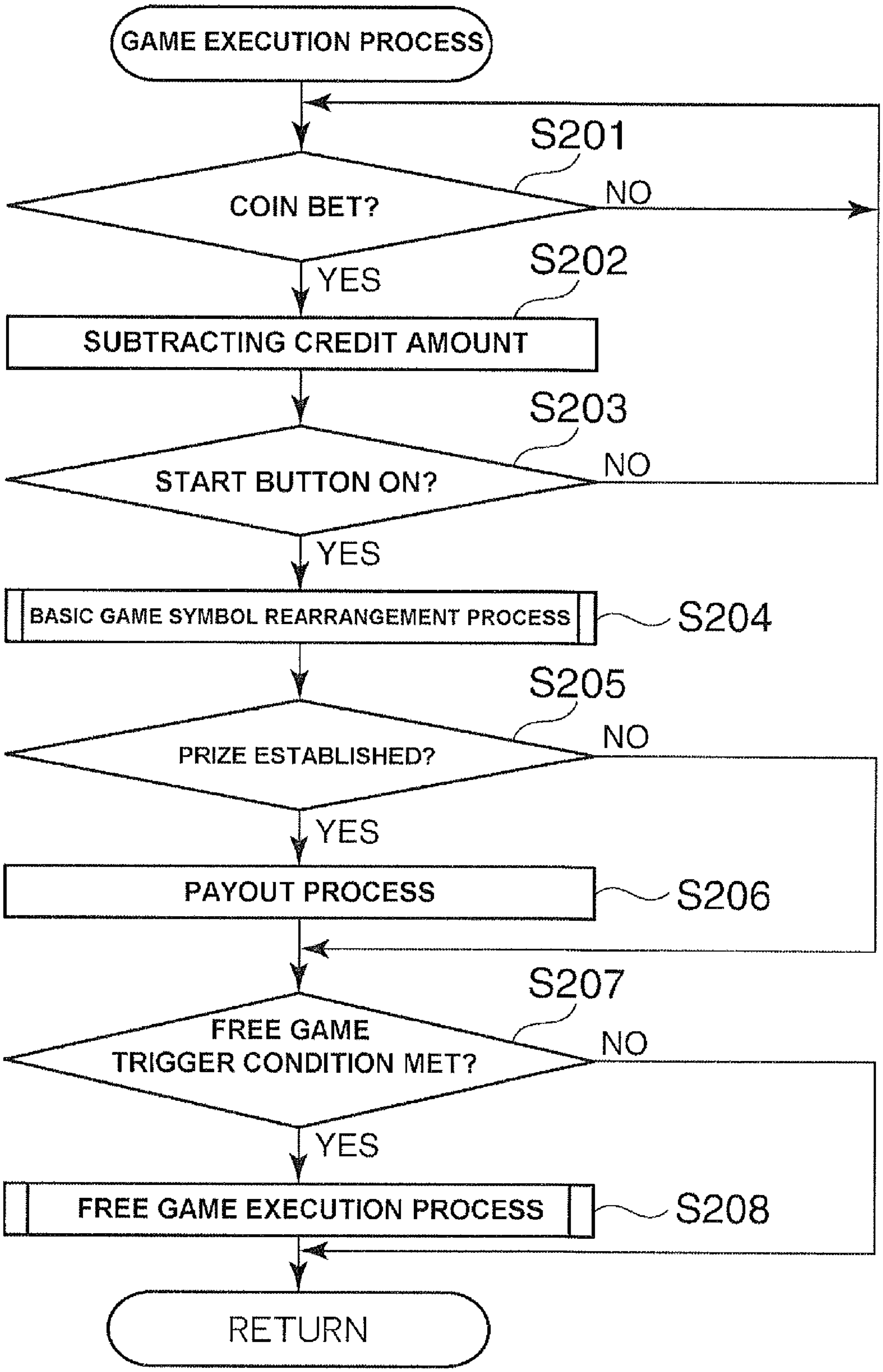
FIG. 9 is a flowchart showing a subroutine of a game execution process according to the first embodiment.

FIG. 9 is a flowchart showing a subroutine of the game execution process invoked and performed at step S102 of the subroutine shown in FIG. 8. First, the main CPU 41 judges whether a coin has been bet or not (step S201). Specifically, the main CPU 41 judges whether or an input signal has been received. The input signal is output from the 1-BET switch 26S at the time of operation of the 1-BET button 26 or output from the MAX-BET switch 27S at the time of operation of the MAX-BET button 27. The main CPU 41 controls the current step to return to the process at step S201 upon judging that no coin has been bet (step S201: NO).

On the other hand, the main CPU 41 subtracts the number of bet coins from the credit amount stored in the RAM 43 (step S202) upon judging that a coin has been bet (step S201: YES). Where the number of bet coins is larger than the credit amount stored in the RAM 43, the main CPU 41 controls the current step to return to step S101 without performing the process for subtracting the number of bet coins from the credit number stored in the RAM 43. Where the number of bet coins exceeds the upper limit (50 coins in this embodiment) of coins that can be bet in one game, the main CPU 41 controls the step to return to step 203 without performing the process for subtracting the number of bet coins from the credit number stored in the RAM 43.

At step S203, the main CPU 41 judges whether or not the start button 23 has been set to ON (step S203). Specifically, the main CPU 41 judges whether or not an input signal output from the start switch 23S at the time of pushing of the start button 23 has been received. The main CPU 41 controls the step to return to step 202 upon judging that the start button 23 has not been set to ON (step S203: NO). Where the start button 23 has not been set to ON (for example, where an instruction has been input to terminate the game without setting the start button 23 to ON), the main CPU 41 cancels acceptance of a subtraction result at step S202.

On the other hand, the main CPU 41 performs a symbol rearrangement process of the basic game (step S204) upon judging that the start button 23 has been set to ON (step S203: YES). Specifically, the CPU 41 executes the program stored in the RAM 43 and determines the symbols to be rearranged in elements of the symbol matrix SM displayed on the lower image display panel 16. The symbols are selected from among the symbols, "main character 121", "sub character 122", "office building 123", "gold bullion 124", "car 125", "stock certificate 126", "jet 127", "villa 128", and "CHANCE 70*a*". This determination is based on the symbol weighting data and random numeric values sampled by sampling the random numeric values in a numerical range which comes under a predetermined range of random numeric values. The CPU 41 then rearranges the symbols in the elements of the symbol matrix SM.

Next, the main CPU 41 judges whether a prize has been established or not (step S205). Specifically, the main CPU 41 judges whether or not the number of symbols of respective types rearranged in the elements of the symbol matrix SM is a winning number allowed to award any of payouts. Herein, the prize is established on condition that a predetermined number of symbols of the same type are rearranged in the elements of the symbol matrix SM.

Upon judging that the prize is established (step S205: YES), the main CPU 41 then performs a coin-payout process in accordance with the amount of bet and the number of coins set for the winning number (step S206). Where the coins are deposited, the main CPU 41 performs a process for summing the number of paid-out coins to the credit amount stored in the RAM 43. On the other hand, upon execution of the coin-payout process, the main CPU 41 pays out the predetermined number of coins by transmitting a control signal to the hopper 66.

Meanwhile, the CPU 41 judges whether a free game trigger condition has been met or not (step S207) when judging that the prize is not established (step S205: NO) or executing the process at step S206. Specifically, the main CPU 41 executes the program stored in the RAM 43 to sample the random numeric values in a numerical range which comes under a predetermined range of random numeric values, thereby judging whether or not the free game trigger condition has been met based on the sampled random numeric values. Upon judging that the free game trigger condition is met (step S207: YES), the main CPU 41 performs a free-game execution process described later with reference to FIG. 11 (step S208). In this free-game execution process, the main CPU 41 sequentially reads and executes the game programs or the like from the ROM 42 and performs the free-game execution process.

The CPU 41 terminates the game execution process when judging that the free game trigger condition is not met (step S207: NO) or when executing the process at step S208.

Figure 10:
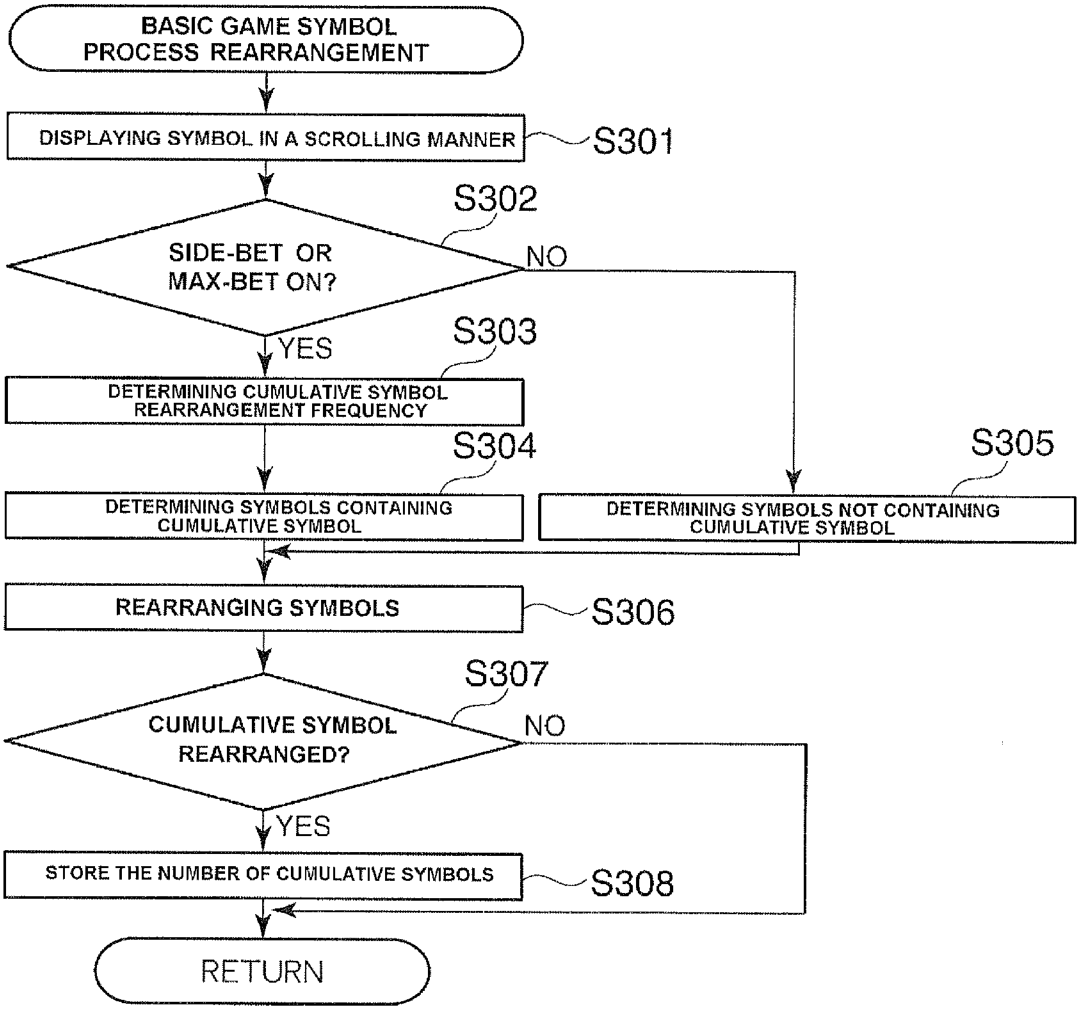
FIG. 10 is a flowchart showing a subroutine of a basic game symbol rearrangement process according to the first embodiment.

FIG. 10 is a flowchart showing a subroutine of a basic game symbol rearrangement process which is invoked and executed at step S204 of the subroutine shown in FIG. 9. First, the main CPU 41 displays the symbols in a scrolling manner (step S301). Specifically, the main CPU 41 successively displays in a scrolling manner the symbols that are rearranged in the elements of the symbol matrix SM displayed on the lower image display panel 16.

Next, the main CPU 41 judges whether the side-BET or the MAX-BET has been set to ON or not (step S302). Specifically, the main CPU 41 judges whether or not an input signal has been received, the signal being output from the side-BET switch 85S when the side-BET button 85 is pressed, or being output from the MAX-BET switch 27S when the MAX-BET button 27 is pressed. Upon judging that the side-BET or the MAX-BET has been set to ON (step S302: YES), the main CPU 41 performs a cumulative symbol rearrangement frequency determination process (step S303). Specifically, the main CPU 41 determines an appearance frequency with which the symbol "CHANCE 70*a*" is rearranged, based on the program stored in the RAM 43. This determination is made by performing a process for increasing the number of rearranged symbols "CHANCE 70*a*" correspondingly to the number of bet coins or the presence or absence of the side-BET, or by performing a process for widening a range of random numeric values set for rearrangement of the predetermined symbols in a case of using random numbers to determine a rearrangement frequency with which the symbols of respective types are rearranged.

The main CPU 41 then performs a process for determining symbols containing the cumulative symbols (step S304). Specifically, the main CPU 41 reads out a storage area provided in the RAM 43, the area storing data concerning the symbols. The main CPU 41 then determines a component ratio of respective symbols in a symbol group based on a rearrangement frequency of the symbol "CHANCE 70*a*" determined at step S303, random numeric values, and symbol weighting data. The random numeric values are sampled by sampling the random numeric values in a numerical range which comes under a predetermined range of random numeric values upon execution of the program stored in the RAM 43. The symbol group contains the symbols, "main character 121", "sub character 122", "office building 123", "gold bullion 124", "car 125", "stock certificate 126", "jet 127", "villa 128", and "CHANCE 70*a*". This determination is based on the symbol weighting data and random numeric values sampled by sampling the random numeric values in a numerical range which comes under a predetermined range of random numeric values.

On the other hand, upon judging that the side-BET or the MAX-BET has not been set to ON (step S304: NO), the main CPU 41 performs a process for determining a symbol group not containing cumulative symbols (step S305). Specifically, the main CPU 41 executes the program stored in the RAM 43 and determines a component ratio of respective symbols in a symbol group containing the symbols, "main character 121", "sub character 122", "office building 123", "gold bullion 124", "car 125", "stock certificate 126", "jet 127", and "villa 128".

Next, the main CPU 41 rearranges symbols (step S306), Specifically, the main CPU 41 determines the symbols to be respectively rearranged in the elements of the symbol matrix SM, from the symbol group determined at step S304 or S305.

The main CPU 41 then judges whether or not the cumulative symbol has been rearranged (step S307). Specifically, in order to determine whether or not the symbols rearranged at step S305 contain the cumulative symbol, the main CPU 41 judges whether a flag is set or not, which is stored in a frame memory region of each frame provided in the RAM 43 and indicates that the symbol "CHANCE 70*a*" serving as the cumulative symbol is currently displayed. Upon judging that the cumulative symbol has not been rearranged, the main CPU 41 terminates the basic game symbol rearrangement process (step S307: NO).

On the other hand, upon judging that the cumulative symbol has been rearranged (step S308: YES), the main CPU 41 performs a process for storing the number of cumulative symbols (step S308). Specifically, the main CPU 41 adds the number of currently-displayed symbols "CHANCE 70*a*" serving as the cumulative symbol to the data that is stored in the RAM 43, the data concerning the number of cumulative symbols having been rearranged during the free game. At the time of termination of this process, the basic game symbol rearrangement process is terminated.

Figure 11:
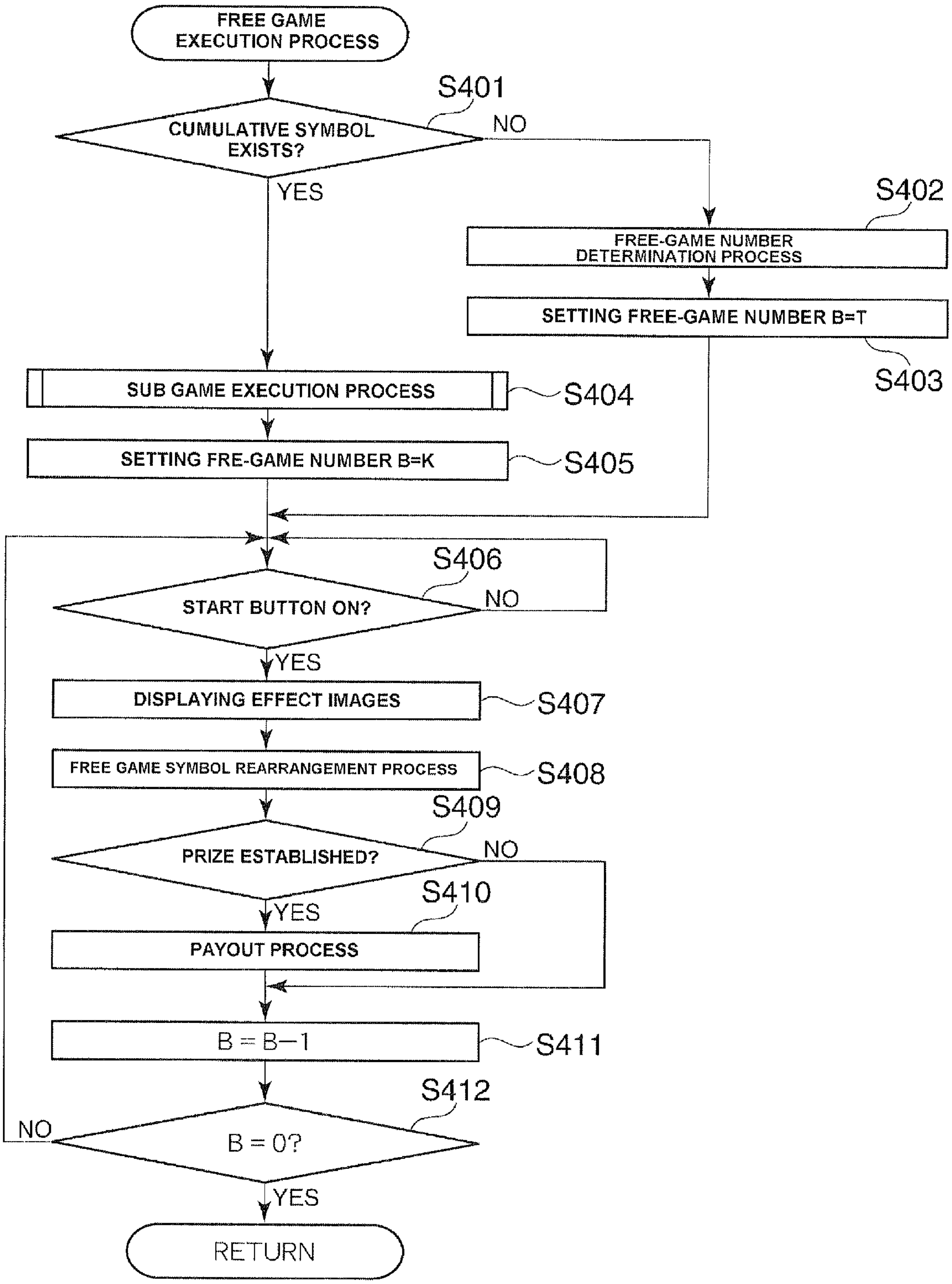
FIG. 11 is a flowchart showing a subroutine of a free game execution process according to the first embodiment.

FIG. 11 is a flowchart showing a subroutine of a free-game execution process invoked and executed at step S208 of the subroutine shown in FIG. 9. First, the main CPU 41 judges whether or not the cumulative symbol exists (step S401). Specifically, the main CPU 41 judges whether or not data stored in the RAM 43, the data concerning the number of cumulative symbols, indicates one or more cumulative symbols. Upon judging that the cumulative symbol exists (step S401: YES), the main CPU 41 performs a sub game execution process (step S404). Specifically, the main CPU 41 determines the sub game outcome information K by executing the sub game. The sub game execution process at step S404 will be described in details later with reference to FIG. 12.

Next, the main CPU 41 sets the free-game number B=K (step S405). Specifically, the main CPU 41 sets a remaining free-game number B=K in a storage area provided in the RAM 43, the area storing the data indicative of the remaining free-game number B as the remaining number of times in executing the free game. K is the sub game outcome information generated at step S506 to be described later.

On the other hand, upon judging that the cumulative symbol does not exist (step S401: NO), the main CPU 41 performs a free-game number determination process (step S402). Specifically, the main CPU 41 executes the program stored in the RAM 43 and determines a free-game number based on random numeric values sampled by sampling the random numeric values in a numerical range which comes under a predetermined range of random numeric values.

Next, the main CPU 41 performs a process for setting a free-game number B=T (step S403). Specifically, the main CPU 41 sets a remaining free-game number B=T in a storage area provided in the RAM 43, the area storing the data indicative of the remaining free-game number B. T is the free-game number determined at step S402.

Next, the main CPU 41 judges whether or not the start button 23 has been set to ON (step S406). Specifically, the main CPU 41 judges whether or not an input signal has been received, the signal being output from the start switch 23S when the start button 23 is pressed. The main CPU 41 controls the step to return to step S406 upon judging that the start button 23 has not been set to ON (step S406: NO).

Upon judging that the start button 23 has been set to ON (step S406: YES), on the other hand, the main CPU 41 performs a process for displaying effect images (step S407). Specifically, the main CPU 41 displays free-game-number display images 90*a* to 90*c* corresponding to the number of times in executing the free game on the upper image display panel 33 (see FIGS. 7A and 7B).

Next, the main CPU 41 performs a process for rearranging symbols in the free game (step S408). Specifically, the CPU 41 executes the program stored in the RAM 43 and determines the symbols to be rearranged in the elements of the symbol matrix SM displayed on the lower image display panel 16. The symbols are selected from among the symbols, "main character 121", "sub character 122", "office building 123", "gold bullion 124", "car 125", "stock certificate 126", "jet 127", and "villa 128". This determination is based on the symbol weighting data and random numeric values sampled by sampling the random numeric values in a numerical range which comes under a predetermined range of random numeric values. The main CPU 41 then rearranges the symbols to be arranged in the elements of the symbol matrix SM.

Next, the main CPU 41 judges whether or not a prize has been established (step S409). Specifically, the main CPU 41 judges whether or not the number of symbols of respective types rearranged in the elements of the symbol matrix SM is a winning number allowed to award any of payouts. Herein, the prize is established on condition that a predetermined number of symbols of the same type are rearranged in the elements of the symbol matrix SM.

Thereafter, upon judging that the prize has been established (step S409: YES), the main CPU 41 performs a coin-payout process in accordance with the number of coins set for the winning number (step S410: YES). In a case where the coins are deposited, the main CPU 41 performs a process for adding the number of paid-out coins to the credit amount stored in the RAM 43. Where the coins are paid out, the main CPU 41 pays out the predetermined number of coins by transmitting the control signal to the hopper 66.

On the other hand, upon judging that the prize has not been established (step S409: NO) or upon executing the process at step S410, the main CPU 41 sets the remaining free-game number B=B−1 (step S411). Specifically, the main CPU 41 sets B=B−1 at a value of the remaining free-game number B stored in the RAM 43.

The main CPU 41 then judges whether or not a value of the remaining free-game number B is equal to zero (step S412). Specifically, the main CPU 41 judges whether or not a value of the remaining free-game number B stored in the RAM 43 is equal to zero. Upon judging that the value of the remaining free-game number B is not zero (step S412: NO), the main CPU 41 controls the step to return to step S406.

On the other hand, upon judging that the value of B is equal to zero (step S412: YES), the main CPU 41 terminates the free-game execution process.

Figure 12:
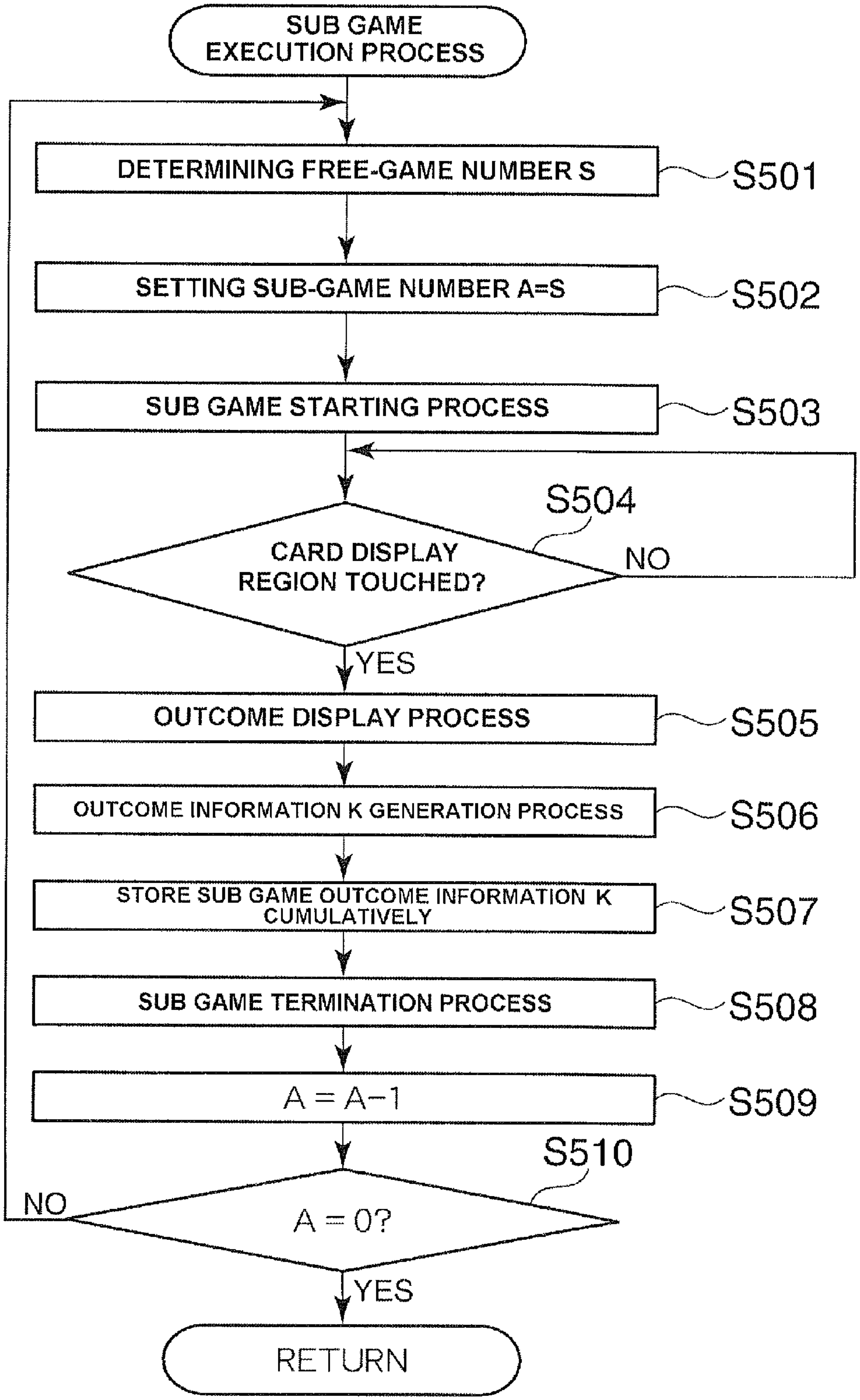
FIG. 12 is a flowchart showing a subroutine of a sub game execution process according to the first embodiment.

FIG. 12 is a flowchart showing a subroutine of the sub game execution process invoked and executed at step S404 shown in FIG. 11. First, the main CPU 41 determines a sub-game number S as the number of times in executing the sub game (step S501). The main CPU 41 reads out the data stored in the RAM 43, the data concerning the number of cumulative symbols having been rearranged during the free game. It is sufficient if the sub-game number S be any corresponding number without a need for being equal to the number of cumulative symbols rearranged in the free game.

Next, the main CPU 41 sets a sub-game number A=S (step S502). Specifically, the main CPU 41 sets a remaining free-game number A=S in the storage area provided in the RAM 43, the area storing the data indicative of the remaining game number A. A is the sub-game number S determined at step S501.

Next, the main CPU 41 performs a sub game starting process (step S503). Specifically, the main CPU 41 activates a sub game program stored in the RAM 43 and based on this program, displays the sub game screen so as to start the sub game (see FIG. 6A).

Next, the main CPU 41 judges whether or not a card display region has been touched (step S504). Specifically, the main CPU 41 judges whether or not an input signal corresponding to each card display region displayed on the display region 92 is received from the touch panel 23. The main CPU 41 controls the step to return to step S504 upon judging that no card display region has been touched (step S504: NO).

On the other hand, upon judging that any of the card display regions has been touched, the main CPU 41 performs an outcome display process (step S505). Specifically, the main CPU 41 displays the card face up, the card corresponding to the region having been touched by the player, thereby notifying to the player a type of the selected card (see FIG. 6B).

Next, the main CPU 41 performs an outcome information K generation process (step S506). Specifically, the main CPU 41 generates the outcome information K used to determine the number of times in executing the free game, correspondingly to the card displayed in a face up state at step S505. In this case, the outcome information K may be set, without change, to the number on the card displayed face up or may be generated using the table stored in the RAM 43 that sets the output information K for each type of card. It should be noted that the present invention is not limitative to the above.

Next, the main CPU 41 performs a process for cumulatively storing the sub game outcome information K (step S507). Specifically, the main CPU 41 cumulatively stores in the RAM 43 the outcome information K of each of the sub games.

Next, the main CPU 41 performs a sub game termination process (step S508). Specifically, the main CPU 41 terminates a sub game program stored in the RAM 43.

Next, the main CPU 41 sets the remaining sub-game number at A=A−1 (step S509). Specifically, the main CPU 41 sets A=A−1 at a value of the remaining sub-game number A stored in the RAM 43.

Next, the main CPU 41 judges whether or not a value of the remaining sub-game number A is equal to zero (step S510). Specifically, the main CPU 41 judges whether or not the value of the remaining sub-game number A stored in the RAM 43 is equal to zero. The main CPU 41 controls the step to return to step S501 upon judging that the value of A is not equal to zero (step S510: NO).

On the other hand, upon judging that a value of A is equal to zero (step S510: YES), the main CPU 41 terminates the sub game execution process.

Figure 13:
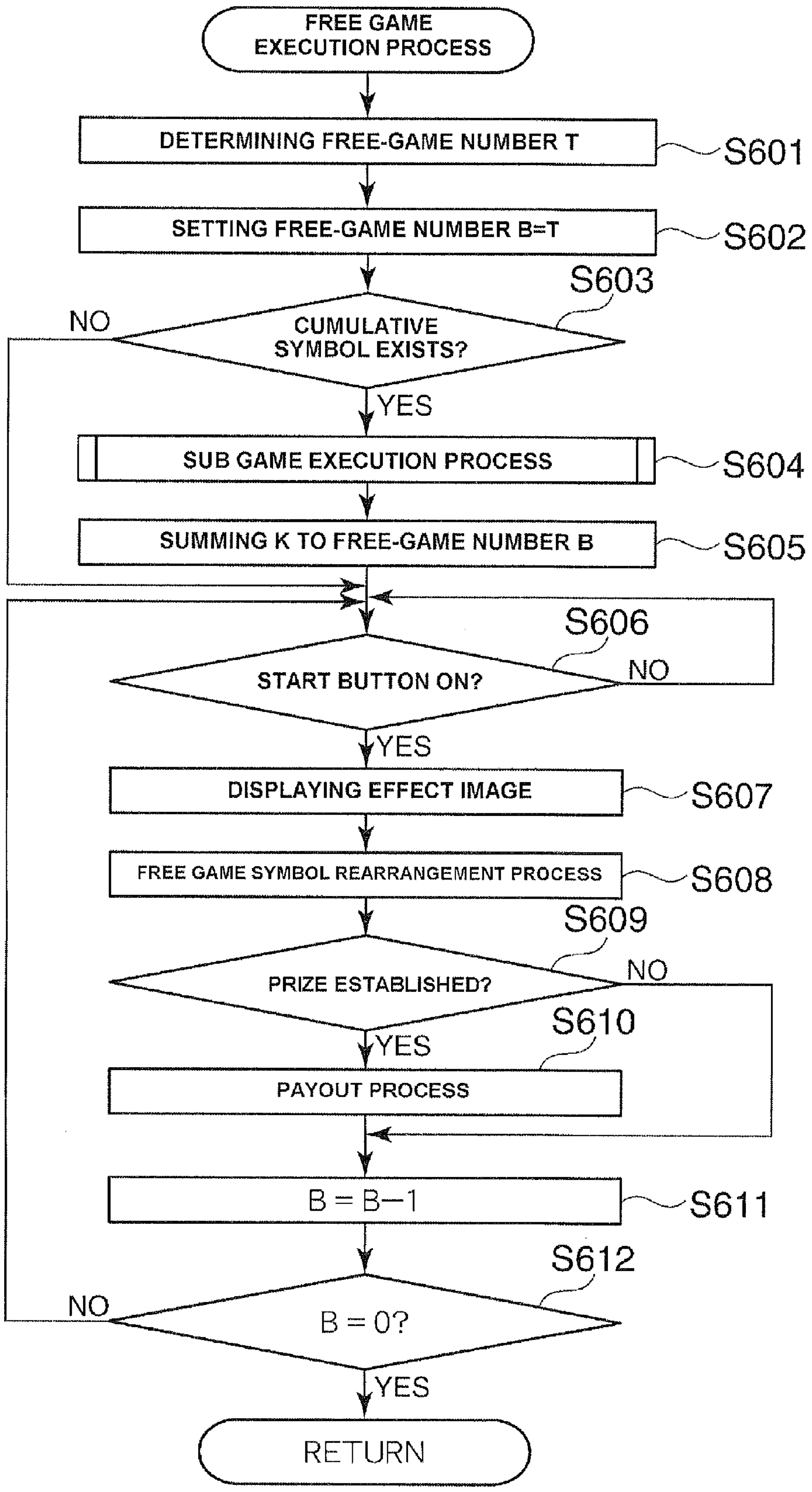
FIG. 13 is a flowchart showing a subroutine of a free game execution process according to a second embodiment.

FIG. 13 shows a second embodiment of the present invention and is a flowchart showing a subroutine invoked and executed at step S208 of the subroutine shown in FIG. 9. First, the main CPU 41 determines the free-game number T (step S601). Specifically, the main CPU 41 determines the free-game number T in accordance with a program stored in the RAM 43.

Next, the main CPU 41 performs a process for setting the free-game number B=K (step S602). Specifically, the main CPU 41 sets a remaining free-game number B=T in a storage area provided in the RAM 43, the area storing the data indicative of the remaining free-game number B. T is the free-game number determined at step S601.

Next, the main CPU 41 judges whether or not the cumulative symbol exists (step S603). Specifically, the main CPU 41 judges whether or not data stored in the RAM 43, the data concerning the number of cumulative symbols having been rearranged during the free game, indicates one or more cumulative symbols. Upon judging that the cumulative symbol exists (step S603: YES), the main CPU 41 performs the sub game execution process (step S604). Specifically, the main CPU 41 performs the sub game execution process shown in FIG. 12.

Next, the main CPU 41 sums K to the free-game number B (step S605). Specifically, the main CPU 41 sums K to the remaining free-game number B in a storage area of the data indicative of the remaining free-game number B provided in the RAM 43. K is the sub game outcome information generated at step S506 in FIG. 12 described above.

On the other hand, upon judging that the cumulative symbol does not exist (step S603: NO), the main CPU 41 judges whether or not the start button 23 has been set to ON (step S606). Specifically, the main CPU 41 judges whether or not an input signal has been received, the signal being output from the start switch 23S at the time of pushing of the start button 23. The main CPU 41 controls the step to return to step S606 upon judging that the start button 23 has not been set to ON (step S606: NO).

Upon judging that the start button 23 has been set to ON (step S606: YES), on the other hand, the main CPU 41 performs a process for displaying an effect image (step S607). Specifically, the main CPU 41 displays the free-game number display image 90*a* corresponding to the number of times in executing the free game on the upper image display panel 33 (see FIGS. 7A and 7B).

Next, the main CPU 41 performs a symbol rearrangement process for the free game (step S608). Specifically, the CPU 41 executes the program stored in the RAM 43 and determines the symbols to be rearranged in the elements of the symbol matrix SM displayed on the lower image display panel. These symbols are selected from among the symbols, "main character 121", "sub character 122", "office building 123", "gold bullion 124", "car 125", "stock certificate 126", "jet 127", and "villa 128". This determination is based on the symbol weighting data and random numeric values sampled by sampling the random numeric values in a numerical range which comes under a predetermined range of random numeric values. The CPU 41 then rearranges the symbols in the elements of symbol matrix SM.

Next, the main CPU 41 judges whether or not a prize has been established (step S609). Specifically, the main CPU 41 judges whether or not the number of symbols of respective types rearranged in the elements of the symbol matrix SM is a winning number allowed to award any of payouts. Herein, the prize is established on condition that a predetermined number of symbols of the same type are rearranged in the elements of the symbol matrix SM.

Thereafter, upon judging that the prize has not been established (step S609: YES), the main CPU 41 performs a coin-payout process for paying out the coins of the number set for the winning number (step S610). In a case where the coins are deposited, the main CPU 41 performs a process for summing the number of paid-out coins to the credit amount stored in the RAM 43. On the other hand, where the coins are paid out, the main CPU 41 pays out the predetermined number of coins by transmitting the control signal to the hopper 66.

On the other hand, upon judging that the prize has not been established (step S609: NO) or upon executing the process at step S512, the main CPU 41 sets the remaining free-game number B=B−1 (step S611). Specifically, the main CPU 41 sets B=B−1 at a value of the remaining free-game number B stored in the RAM 43.

The main CPU 41 then judges whether or not a value of the remaining free-game number B is equal to zero (step S612). Specifically, the main CPU 41 judges whether or not a value of the remaining free-game number B stored in the RAM 43 is equal to zero. Upon judging that the value of the remaining free-game number B is not zero (step S612: NO), the main CPU 41 controls the step to return to step S508.

On the other hand, upon judging that the value of B is equal to zero (step S612: YES), the main CPU 41 terminates the free-game execution process.

Next, a slot machine 100 according to a third embodiment will be described with reference to the drawings. The slot machine according to the third embodiment below is a so-called hybrid slot machine in which a plurality of rotatably-supported mechanical reels have a transparent liquid crystal panel on front surfaces to display images of various symbols drawn on peripheral surfaces of the mechanism reels through the transparent liquid crystal panel through which the pictures are allowed to pass. The slot machine according to the third embodiment has an appearance, circuitry, and the like that are substantially the same as those of the slot machine 10 according to the first embodiment. Thus, a duplicated explanation is omitted here. Constituent elements corresponding to those of the slot machine 10 are designated by the same reference numerals and are explained.

Figure 14:
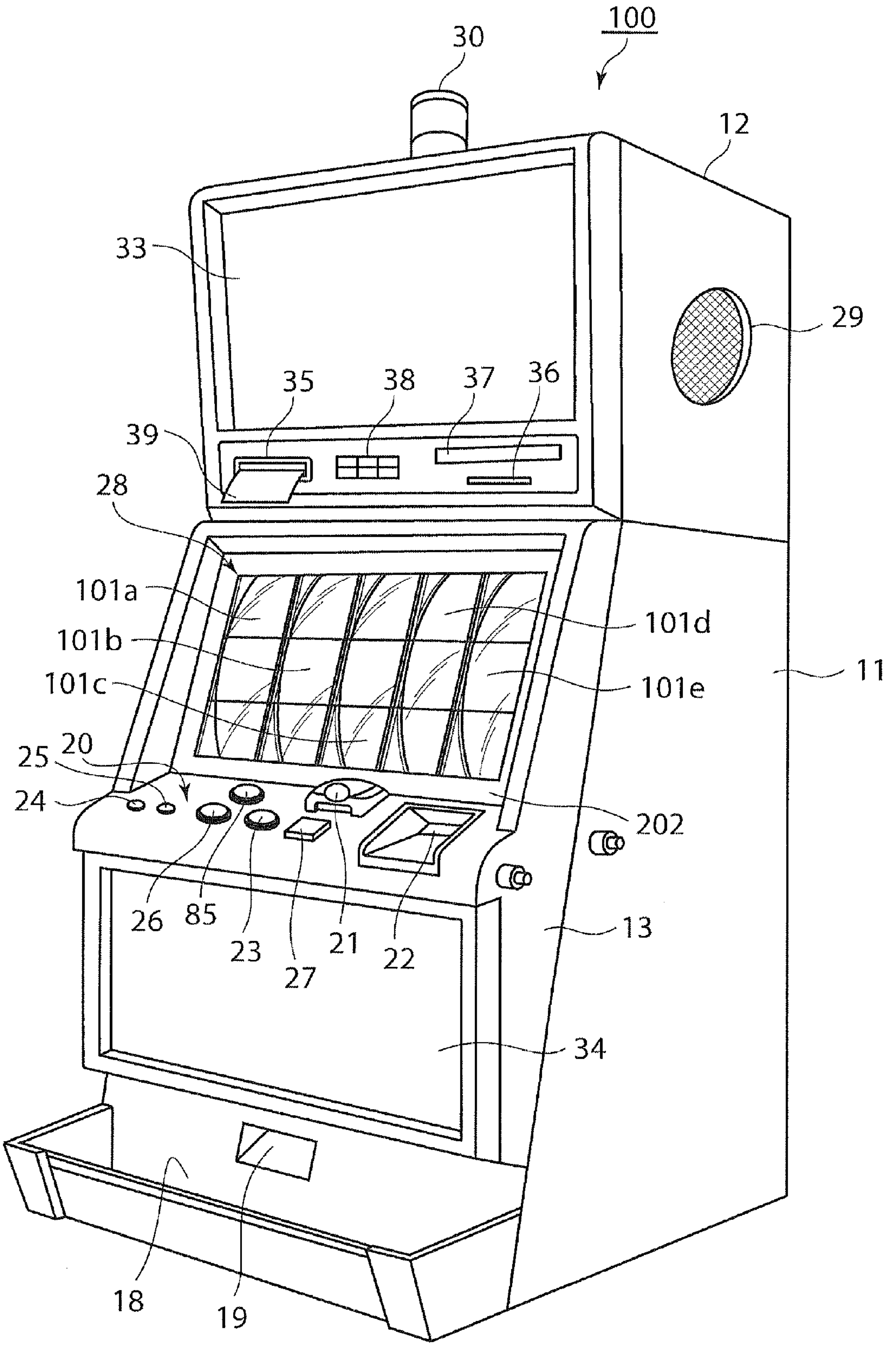
FIG. 14 is a view schematically showing a frame format of an appearance of a slot machine according to a third embodiment.

FIG. 14 is a view schematically showing an appearance of the slot machine according to the third embodiment. As shown in FIG. 14, the slot machine 100 is rotatably provided with five reels 101*a* to 101*e*. A symbol column made up of the symbols "main character 121", "sub character 122", "office building 123", "gold bullion 124", "car 125", "stock certificate 126", "jet 127", and "villa 128" is drawn on the respective one of the outer circumferential surfaces of the reels 101*a* to 101*e*.

A main liquid crystal panel 202 formed of a transparent liquid crystal panel, which is disposed at the main door, is provided in front of the respective reels 101*a* to 101*e*. The main liquid crystal panel 202 displays the symbol display region 28 with visually recognizable rear surface so as to surround symbols displayed in the reels 101*a* to 101*e* in a stopped state, respectively. The symbols drawn on the reels 101*a* to 101*e* are visualized by rendering the symbol display region transparent.

Figure 15A:
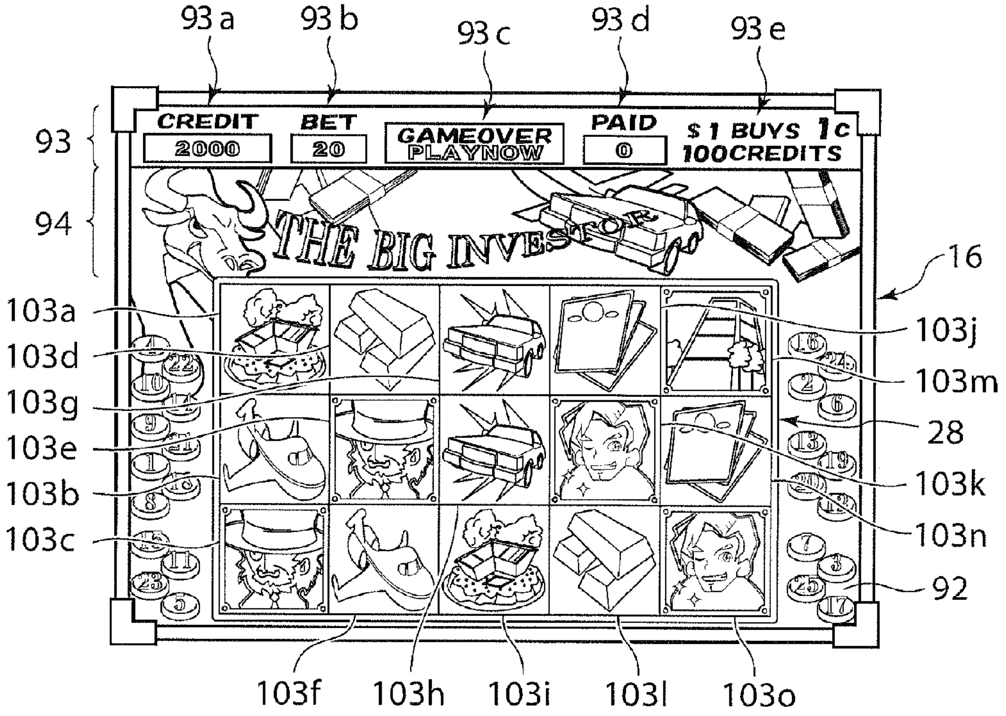
FIG. 15A is a view showing an exemplary symbol matrix during a basic game according to the third embodiment.
Figure 15B:
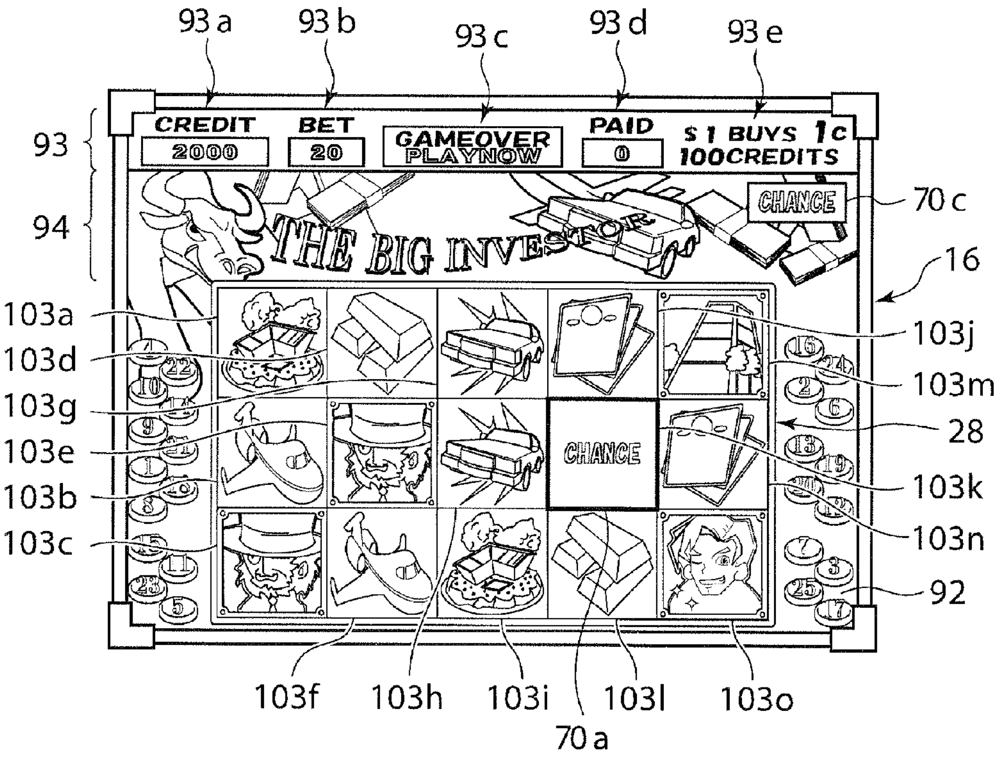
FIG. 15B is a view showing an exemplary symbol matrix during the basic game according to the third embodiment.

FIGS. 15A and 15B are views each showing an exemplary symbol matrix during the basic game. As shown in FIGS. 15A and 15B, with respect to the symbol matrix SM, the symbol display region 28 is displayed on the main liquid crystal panel 202 provided at the slot machine 100 according to the present invention. A total of five reels 101*a* to 101*e* in five columns are rotatably provided rearwardly of the liquid crystal panel 202.

As shown in FIG. 15A, the five reels 101*a* to 101*e* are displayed in a stopped state during the basic game. The respective frames 103*a* to 103*o* of the symbol display region in the main liquid crystal panel 202 are transparently displayed so as to render these five reels 1010*a* to 101*e* visually recognizable. In this case, with the use of the reels 101*a* to 101*e*, the symbols "main character 121", "sub character 122", "office building 123", "gold bullion 124", "car 125", "stock certificate 126", "jet 127", and "villa 128" are displayed in a stopped state and the payout is determined based on the number of symbols of respective types that are displayed in a stopped state.

As shown in FIG. 15B, the five reels 101*a* to 101*e* are displayed in a stopped state during the basic game. The respective frames 103*a* to 103*o* corresponding to the elements of the symbol matrix SM in the main liquid panel 202 are transparently displayed so as to render these five reels 101*a* to 101*e* visually recognizable. However, in a case, for example, where the basic game is started upon placing the side-BET or the MAX-BET, the symbol "CHANCE 70*a*" is occasionally displayed so as to cover the reel 101 in the symbol display region 28. In this case, the reel 101*d* is displayed in a stopped state, displaying thereon the symbols "stock certificate 126", "main character 121", and "gold bullion 124" from top down. In this state, the symbol "CHANCE 70*a*" is displayed in the frame 103*k* of the symbol display region 28 so as to cover the symbol "main character 121" on the reel 101*d*. Then, the icon "CHANCE 70*c*"0 is displayed on the effect image display section 94 so as to indicate the number of the symbols "CHANCE 70*a*" that have been displayed during an interval between completion of the previous free game and start of the next free game. It should be noted that the displayed number of the icons "CHANCE 70*c*" is cumulatively increased every time the symbol "CHANCE 70*a*" is displayed.

Figure 16:
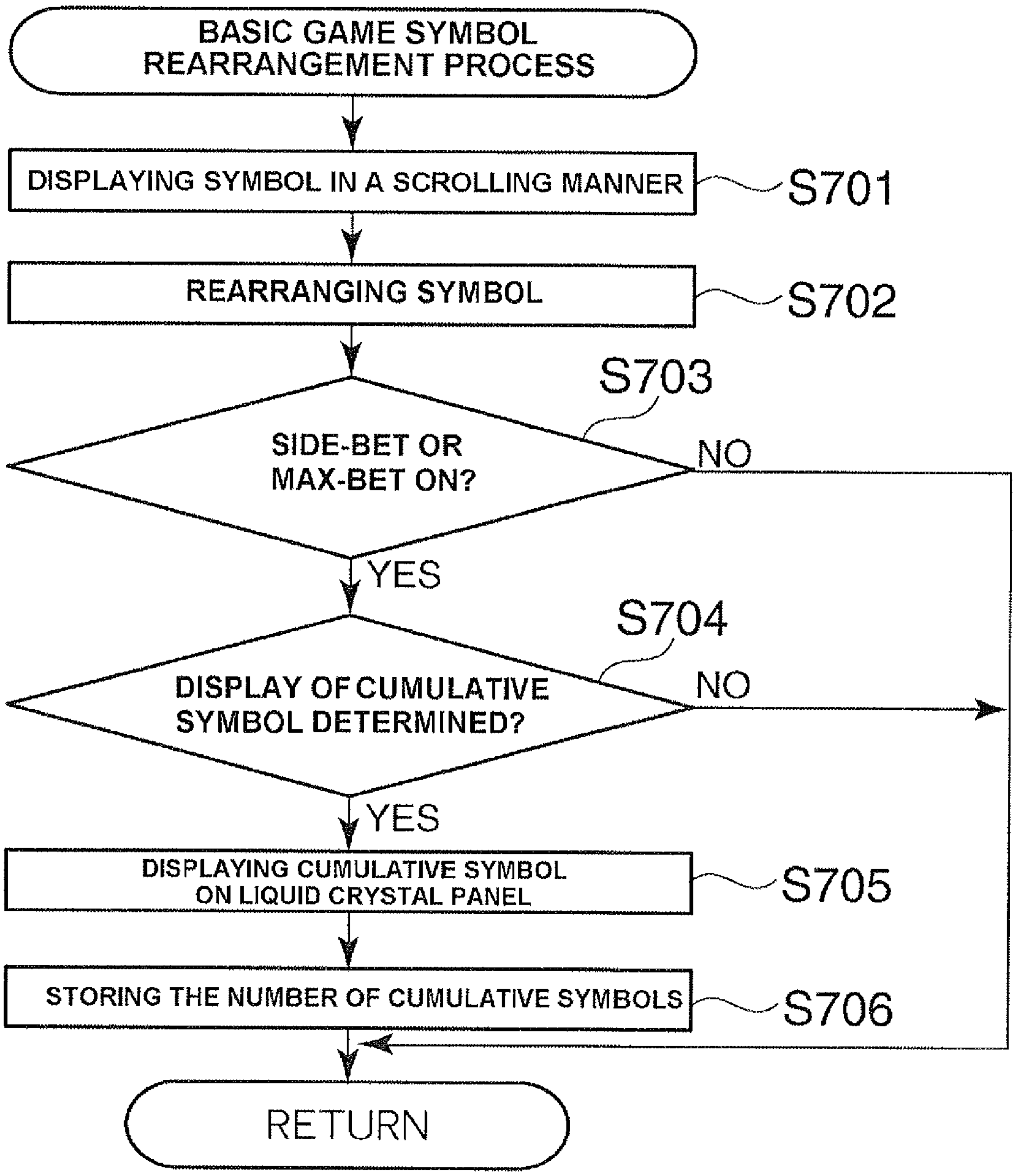
FIG. 16 is a flowchart showing a subroutine of a basic game symbol rearrangement process according to the third embodiment.

FIG. 16 is a flowchart showing a subroutine of the basic game symbol rearrangement process according to the third embodiment invoked and executed at step S204 of the subroutine in FIG. 9. First, the main CPU 41 displays the symbols in a scrolling manner (step S701). Specifically, the main CPU 41 rotatably displays the five reels 101*a* to 101*e*.

The main CPU 41 then rearranges the symbols (step S702). Specifically, the CPU 41 executes the program stored in the RAM 43 and determines the symbols to be rearranged in the elements of the symbol matrix SM displayed on the lower image display panel 16. The symbols are selected from among the symbols "main character 121", "sub character 122", "office building 123", "gold bullion 124", "car 125", "stock certificate 126", "jet 127", and "villa 128". This determination is based on the symbol weighting data and random numeric values sampled by sampling the random numeric values in a numerical range which comes under a predetermined range of random numeric values. The CPU 41 then rearranges the symbols by switching and displaying the reels 101*a* to 101*e* from a rotatable state into a stopped state.

Next, the main CPU 41 judges whether the side-BET or the MAX-BET has been set to ON (step S703). Specifically, the main CPU 41 judges whether or not an input signal has been received, the signal being output from the side-BET switch 85S when the side-BET button 85 is pressed, or alternatively, being output from the MAX-BET switch 27S when the MAX-BET button 27 is pressed. Upon judging that the side-BET or the MAX-BET has not been set to ON (step S702: NO), the main CPU 41 terminates the symbol rearrangement process.

On the other hand, upon judging that the side-BET or the MAX-BET has been set to ON or not (step S703: YES), the main CPU 41 performs a process for judging whether or not display of the cumulative symbol has been determined (step S704). Specifically, the main CPU 41 judges whether to display the cumulative symbol in the symbol display region 28 in accordance with the program provided in the RAM 43. Upon judging that display of the cumulative symbol is not determined (step S704: NO), the main CPU 41 terminates the basic game symbol rearrangement process.

On the other hand, upon judging that display of the cumulative symbol is determined (step S704: YES), the main CPU 41 performs a process for displaying the cumulative symbol on the liquid crystal panel (step S705). Specifically, the main CPU 41 displays the cumulative symbols, the number of which has been determined to be displayed at step S704, in any of the frames 103*a* to 103*o* of the symbol display region 28.

Next, the main CPU 41 performs a process for storing the number of cumulative symbols (step S706). Specifically, the main CPU 41 sums and stores the number of currently-displayed symbols "CHANCE 70*a*" serving as the cumulative symbol to the data stored in the RAM 43. The number of currently-displayed symbols "CHANCE 70*a*" has been stored in a frame memory region of each frame provided in the RAM 43 while the data stored in the RAM 43 is relevant to the number of cumulative symbols having been rearranged during the free game. At the time of termination of this process, the symbol rearrangement process is terminated.

In the foregoing, while the embodiments of the present invention have been described, these embodiments merely present specific examples. An appropriate design change can be made for the specific configuration of each means or the like. Also, the effects described in the embodiments of the present invention are only listing the most preferable effects arising from the present invention, and the effects of the present invention are not limited to those described in the embodiments of the present invention.

What is claimed is:

1. A slot machine, comprising:

a display device for displaying a symbol matrix display region in which plural types of symbols are displayed;

a memory for storing data concerning a number of predetermined symbols arranged in the symbol matrix display region; and a processor for controlling the display device and the memory, the processor being programmed to:

(a) execute a basic game;

(b) rearrange the plural types of symbols in the symbol matrix display region during the basic game;

(c) cumulatively store in the memory, the data concerning the number of the predetermined symbols from among the plural types of symbols, the predetermined symbols being rearranged in the symbol matrix display region during the basic game;

(d) determine a number of times to execute a free game based upon the result of an executed sub game wherein the number of times to execute the sub game equals the number of the predetermined symbols rearranged in the symbol matrix display region, by referring to the data concerning the number of the predetermined symbols stored in the memory; and (e) execute the free game based on the number of times determined in the itemized (d).

2. The slot machine according to claim 1, further comprising a control panel for receiving operation by a player, wherein:

the processor is further programmed to:

(f) determine an appearance frequency with which the predetermined symbol from among the plural types of symbols is rearranged in the symbol matrix display region during the basic game in accordance with an operation status of the control panel; and the processor, in the itemized (b), rearranges the plural types of symbols in the symbol matrix display region during the basic game so that the predetermined symbol is rearranged within a range of the appearance frequency determined in the itemized (f).

3. The slot machine according to claim 1, wherein:

the processor, in the itemized (e), executes the free game based on a total number of times which is obtained by summing a predetermined number of times to the number of times in executing the free game that is determined in the itemized (d).

4. The slot machine according to claim 1, wherein:

the processor, in the itemized (d), determines the number of times in executing the free game by summing numbers of times in executing the free game that are determined in the sub games, respectively.

5. A slot machine, comprising:

a display device for displaying a symbol matrix display region in which plural types of symbols are displayed;

a memory for storing data concerning a number of predetermined symbols arranged in the symbol matrix display region;

a control panel for receiving operation by a player; and a processor for controlling the display device and the memory, the processor being programmed to:

(a) execute a basic game;

(b) determine an appearance frequency with which the predetermined symbol from among the plural types of symbols is rearranged in the symbol matrix display region during the basic game in accordance with an operation status of the control panel;

(c) rearrange the plural types of symbols in the symbol matrix display region during the basic game so that the predetermined symbol is rearranged within a range of the determined appearance frequency;

(d) cumulatively store in the memory, the data concerning the number of the predetermined symbols from among the plural types of symbols, the predetermined symbols being rearranged in the symbol matrix display region during the basic game;

(e) determine a number of times to execute a free game based upon the result of an executed sub game wherein the number of times to execute the sub game equals the number of the predetermined symbols rearranged in the symbol matrix display region, by referring to the data concerning the number of the predetermined symbols stored in the memory; and (f) execute the free game based on the number of times determined in the itemized (e).

6. The slot machine according to claim 5, wherein:

the processor, in the itemized (f), executes the free game based on a total number of times which is obtained by summing a predetermined number of times to the number of times in executing the free game that is determined in the itemized (e).

7. The slot machine according to claim 5, wherein:

the processor, in the itemized (e), determines the number of times in executing the free game by summing numbers of times in executing the free game that are determined in the sub games, respectively.

8. A slot machine, comprising:

a display device for displaying a symbol matrix display region in which plural types of symbols are displayed;

a memory for storing data concerning a number of predetermined symbols arranged in the symbol matrix display region;

a control panel for receiving operation by a player; and a processor for controlling the display device and the memory, the processor being programmed to:

(a) execute a basic game;

(b) determine an appearance frequency with which the predetermined symbol from among the plural types of symbols is rearranged in the symbol matrix display region during the basic game in accordance with an operation status of the control panel;

(c) rearrange the plural types of symbols in the symbol matrix display region during the basic game so that the predetermined symbol is rearranged within a range of the determined appearance frequency;

(d) cumulatively store in the memory, the data concerning the number of the predetermined symbols from among the plural types of symbols, the predetermined symbols being rearranged in the symbol matrix display region during the basic game;

(e) determine a number of times to execute a free game based upon the result of an executed sub game wherein the number of times to execute the sub game equals the number of the predetermined symbols rearranged in the symbol matrix display region, by referring to the data concerning the number of the predetermined symbols stored in the memory and by summing numbers of times in executing the free game that are determined in the sub games, respectively; and (f) execute the free game based on a total number of times which is obtained by summing a predetermined number of times to the number of times in executing the free game that is determined in the itemized (e).

* * * * *